US008430329B2

(12) United States Patent
Kiuchi et al.

(10) Patent No.: US 8,430,329 B2
(45) Date of Patent: Apr. 30, 2013

(54) TWO-DIMENSIONAL CODE PUBLISHING PROGRAM AND TWO-DIMENSIONAL CODE DECODING PROGRAM

(76) Inventors: Yutaka Kiuchi, Hiratsuka (JP); Kohshiro Inomata, Sagamihara (JP)

( * ) Notice: Subject to any disclaimer, the term of this patent is extended or adjusted under 35 U.S.C. 154(b) by 737 days.

(21) Appl. No.: 12/382,316

(22) Filed: Mar. 13, 2009

(65) Prior Publication Data
US 2009/0232392 A1 Sep. 17, 2009

(30) Foreign Application Priority Data

Mar. 14, 2008 (JP) ................................. 2008-065878
Mar. 14, 2008 (JP) ................................. 2008-065879

(51) Int. Cl.
*G06K 19/05* (2006.01)

(52) U.S. Cl.
USPC .................................... 235/494; 235/462.04

(58) Field of Classification Search ............. 235/462.01, 235/462.04, 462.1; 382/166, 169; 332/166, 332/169
See application file for complete search history.

(56) References Cited

U.S. PATENT DOCUMENTS

| | | |
|---|---|---|
| 5,355,001 A | 10/1994 | Fujimoto et al. |
| 5,541,396 A | 7/1996 | Rentsch |
| 5,568,555 A | 10/1996 | Shamir |
| 6,364,209 B1 | 4/2002 | Tatsuta et al. |
| 2006/0274952 A1* | 12/2006 | Nakai ........................... 382/232 |
| 2006/0282500 A1* | 12/2006 | Kiuchi et al. .................. 709/203 |
| 2007/0051813 A1* | 3/2007 | Kiuchi et al. ............... 235/462.1 |

FOREIGN PATENT DOCUMENTS

| | | |
|---|---|---|
| JP | 03-245283 A | 10/1991 |
| JP | 05-054214 A | 3/1993 |
| JP | 07-254037 A | 10/1995 |
| JP | 08-030977 A | 2/1996 |
| JP | 2000-235617 A | 8/2000 |

OTHER PUBLICATIONS

International Search Report, mailing date of Aug. 10, 2004, issued in International Application No. PCT/JP2004/005862; cited in related U.S. Patent No. 7,938,330.

* cited by examiner

*Primary Examiner* — Daniel St. Cy
(74) *Attorney, Agent, or Firm* — Westerman, Hattori, Daniels & Adrian, LLP

(57) ABSTRACT

A two-dimensional code publishing program that provides display of beautiful two-dimensional codes with homogeneity and a high sense of design, and a two-dimensional code decoding program that decodes bit strings expressed as two-dimensional codes in various situations.
In a display of cells having a color with a low visibility against the blank area surrounding the two-dimensional code, a contrast is set between the gradation of the color component having a gradation close to that of the blank area and/or in a display of cells having a color with a high visibility against the blank area surrounding the two-dimensional code, the contrast is reduced between the gradation of the color component having a gradation far from that of the blank area.

16 Claims, 8 Drawing Sheets

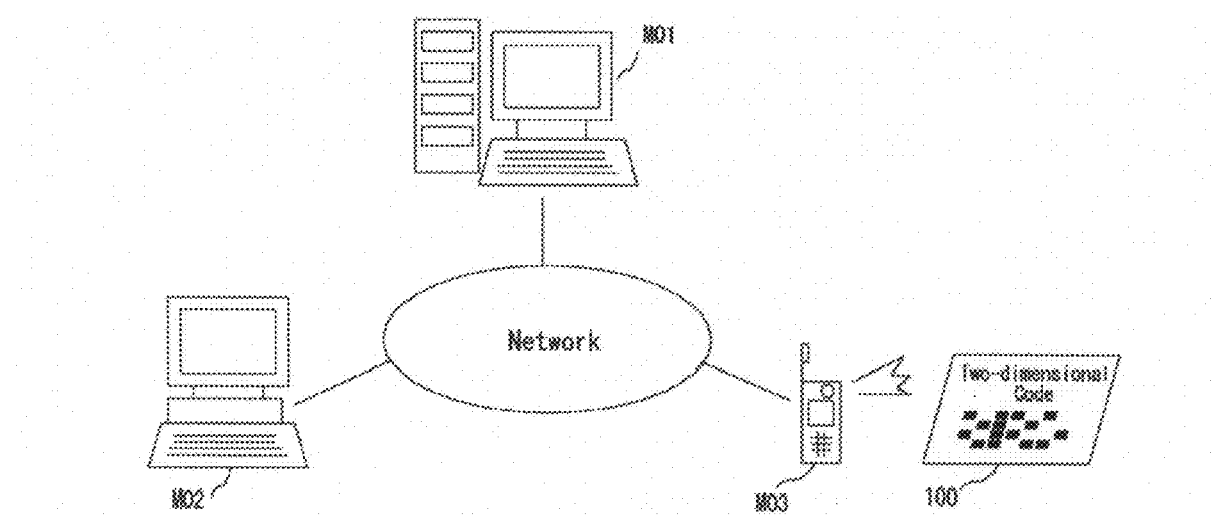
Fig. 1
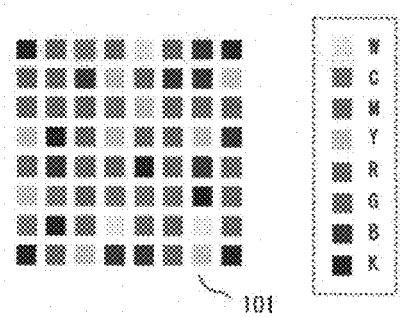
Fig. 2
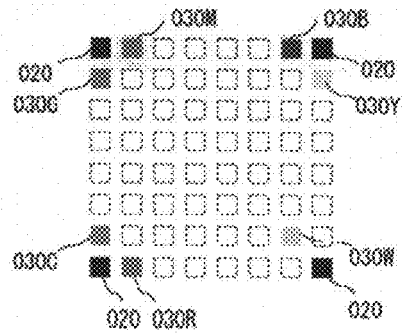
Fig. 3
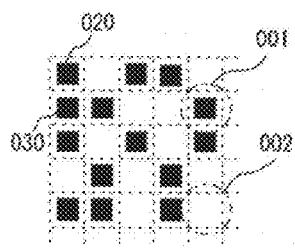
Fig. 4
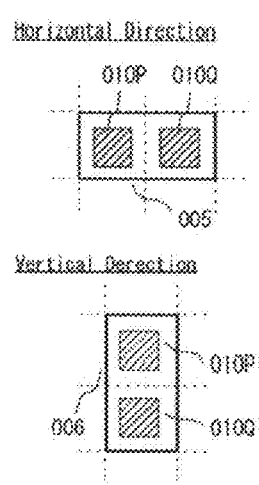
Fig. 5
Fig. 6
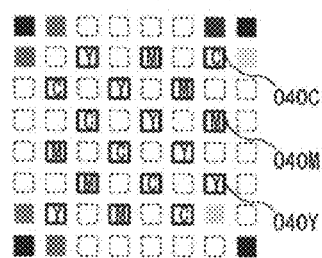
Fig. 7

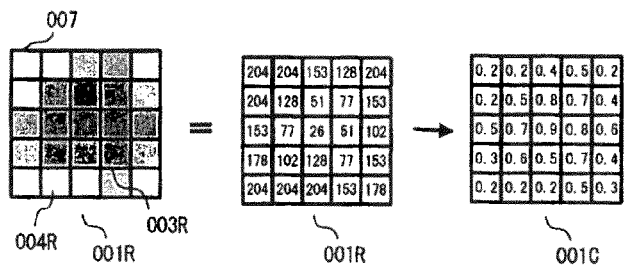
Fig. 15
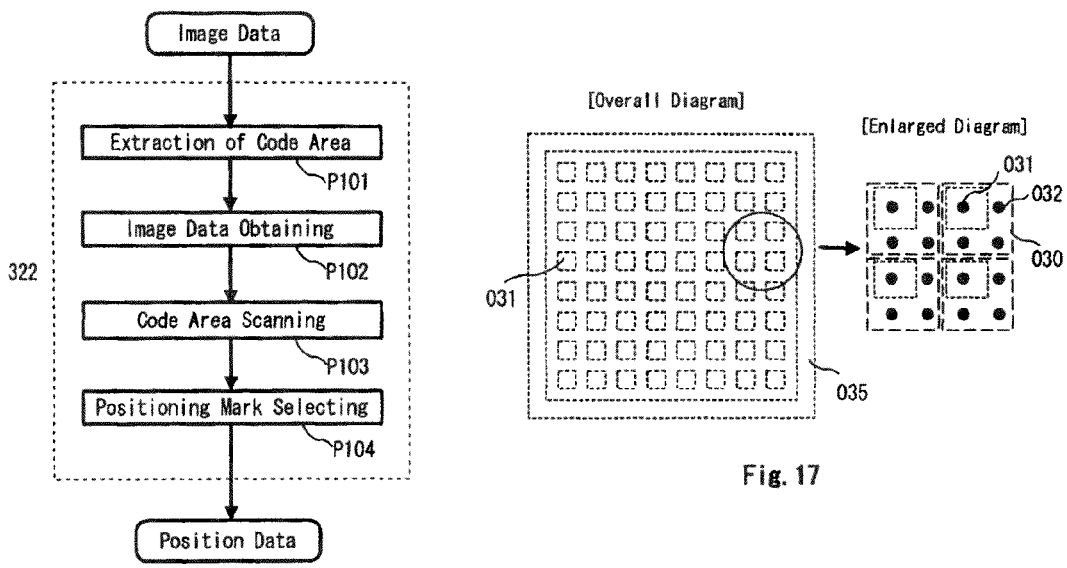
Fig. 16
Fig. 17
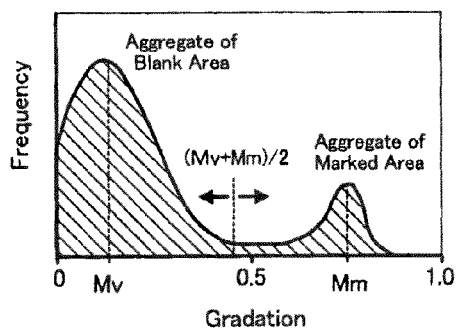
Fig. 18
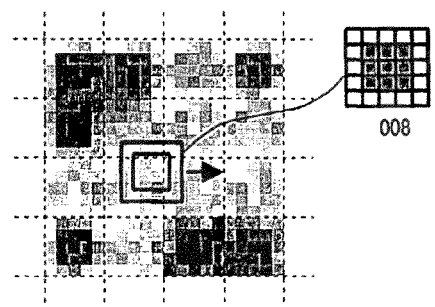
Fig. 19

TWO-DIMENSIONAL CODE PUBLISHING PROGRAM AND TWO-DIMENSIONAL CODE DECODING PROGRAM

CROSS-REFERENCE TO RELATED APPLICATION

This application claims priority under 35 USC 119 from Japanese Patent Application No. 2008-065878 and No. 2008-065879, the disclosures of which are incorporated by reference herein.

BACKGROUND OF THE INVENTION

1. Technical Field

This invention relates to a two-dimensional code publishing program and a two-dimensional code decoding program for decoding a bit string expressed as a two-dimensional code displayed on a display of an image display device or output on a sheet-like media or a surface of a solid object by a image forming device. Image of the two-dimensional code is captured by an image-capturing device, and the obtained image data is analyzed using a computer to decode the bit string.

2. Related Arts

A two-dimensional code is generally composed of a plurality of cells arranged in a lattice pattern and positioning symbols disposed around the cells, and expresses a bit string on a flat surface. A bit string is normally the smallest unit of information a computer can handle, and consists of a sequence of binary digits 0 and 1 in a binary string.

The cells are envisioned on a white flat surface, for example, and are composed of two types of cells: 1) marked cells with a black data mark and 2) white blank cells without a data mark. Thus, a bit string can be expressed by a formation of a layout pattern by displays of the two types of cells. For example, a bit string of 0's and 1's is expressed by substituting each 1 with a marked cell and each 0 with a blank cell.

For a two-dimensional code represented in such a way, the bit string can be decoded by obtaining an image data of the two-dimensional code using an image-capturing device and analyzing the obtained image data. A computer is used for analyzing, and the positions of the cells in the image data are calculated to determine the display of the cells by the calculated positions. As a result, the bit string represented as the two-dimensional code can be decoded based on the determined display of cells.

In doing so, the positions of the cells are calculated based on positioning symbols or positioning marks denoted at given fixed locations. For example, a method for calculating the position of each cell based on the size and orientation of the two-dimensional code in the image data which are obtained from the distance and the angle between more than two detected positioning symbols/marks is known.

There is also known a method to determine the display of cells by the gradation value (or density) at the approximate center of a cell. In this method, the gradation of the center pixel of a cell is compared to a preset threshold value, and cells with a higher gradation (higher density) than the threshold value is considered to be a marked cell and cells with a lower gradation (lower density) is considered to be a blank cell.

The threshold value can be calculated based on the gradation of a reference image displayed in a predetermined area (patent document 1). By using this method, it is possible to improve the accuracy of determination as the reliability of the threshold value rises.

In recent years, as a further development to conventional two-dimensional codes, colored two-dimensional codes that display the cells with multiple colors are suggested (patent document 1). By displaying cells using multiple types of colors, it is possible to denote bit strings with higher density compared to monochrome two-dimensional codes composed of only two colors, black and white.

In two-dimensional codes, bit strings can be denoted with higher density compared to conventional bar codes. In other words, bit strings having a desired volume can be represented on a limited display area. Due to such a feature, two-dimensional codes have been utilized in various ways in recent years.

For example, two-dimensional codes represent digital information such as textual information, image information, audio information, cryptographic information and computer command codes on an image display device, and are read by an image-capturing device. Furthermore, it is used to record such digital information onto sheet-like media such as paper or surfaces of solid objects such as an electronic component.

As a method to utilize two-dimensional codes effectively, a technique to express bit strings prepared in correspondence to record numbers in a database is disclosed (patent literature 2). In this case, targeted digital information are not embedded in two-dimensional codes, but are associated with bit strings and are stored and managed on the network via a server. Therefore, the amount of information that can be handled is not limited by the display area of two-dimensional codes. It becomes possible to target large volume information including video information and such, in addition to the aforementioned types of digital information.

There is also disclosed a method to perform a predetermined conversion to bit strings expressed as two-dimensional codes (patent literature 2). For example, performing encoding process can prevent illegitimate access by a third person. Also, using error-correcting codes prevents read errors that are caused by determination errors of the display of cells.

Patent Document 1: U.S. Patent Application Publication No. 2007/0051813 A1
Patent Document 2: U.S. Patent Application Publication No. 2006/0282500 A1

Due to such technical advancements as increase in computer processing speed and storage medium memory capacity, larger volume of digital data can now be handled. Also, with the advancement in communication technologies, network environment is being established allowing for easy sending and receiving of such digital data. Increase in communication speed and penetration rate of wireless communication using portable devices is especially apparent. Users can now exchange information in various scenes, free from time and geographical constraints.

Due to the above background, two-dimensional codes are used by many users for various objectives, and are seen in various scenes. Now, two-dimensional codes are no longer just input/output means of information, but are symbolic representations of digital information. Therefore, they are expected to have homogeneous and beautiful design without incongruities. At the same time, bit strings are required to be denoted with high density and be decoded in various situations.

Overall, there is a need to be able to handle digital information that surrounds us in a simpler and more comfortable way.

In a two-dimensional code where each cell is represented in color, a larger number of bits can be expressed in a unit area. On the other hand, because each cell of the two-dimensional code is displayed brightly, users have high expectations for the design and beautiful display of the two-dimensional code.

When the cells are colored in white or yellow, for example, and do not stand out against the background surrounding the two-dimensional code, it may appear as if the marks on the cells are missing. In such a case, incongruity occurs since those cells do not look homogeneous with cells represented in other colors. This is especially apparent when lightly colored cells are placed at the border between the two-dimensional code and the surrounding area (edge cells).

When the cells are colored in black, for example, and stand out too strongly against the background surrounding the two-dimensional code, incongruity may also occur since the marks on those cells appear emphasized and not homogeneous with other cells.

With colored cells, while the variation of display increases, determination errors are more likely to occur than with monochrome cells where the only factor to determine is the presence or absence of a mark. There are several causes for determination error to occur. For example, when the display of cells consists of a combination of plural color ingredients, each of the color ingredients within the image data obtained at the decoding of the two-dimensional code may vary in color by influence from other color ingredients.

The two-dimensional code within the image data obtained at the decoding of the two-dimensional code may be disarrayed due to input or output conditions. Decoding errors are more likely to occur in such a case. Possible causes of image disarray that occur when the two-dimensional code is being output may be misalignment of output position or output density or curving of the display surface by the output device. Examples of causes of image disarray that occur when the two-dimensional code is being input may include optical distortion of the input device, misalignment of input gradation, slanting of the capturing angle and the input device being out of focus.

SUMMARY OF THE INVENTION

The present invention was made in view of the foregoing background and with an aspect to provide a two-dimensional code publishing program and a two-dimensional code decoding program that provides beautiful two-dimensional codes with a high sense of design, and allows for bit strings that are represented to be decoded in various situations. Thus, it becomes possible to handle digital information easily and comfortably.

A two-dimensional code publishing program according to an aspect of the present invention is a program for publishing a two-dimensional code expressing a bit string on a plurality of cells arranged two-dimensionally by a combination of gradations of a plurality of color components that constitute a display of each of the plurality of cells, and comprises the following steps: setting, when a display of a cell has a color with a low visibility against a blank area surrounding the two-dimensional code, a gradation of a color component having a gradation close to that of the blank area so that a contrast is created between the blank area and the display of the cell; and/or setting, when a display of a cell has a color with a high visibility against the blank area surrounding the two-dimensional code, a gradation of a color component having a gradation far from that of the blank area is set so that a contrast is reduced between the blank area and the display of the cell.

An advantage according to this aspect of the present invention is that each of the cells are displayed in a favorable color, and that a highly homogenous display is obtained throughout the entire cell area. Thus, it becomes possible to provide beautiful two-dimensional codes with a high sense of design.

For a display having a color with a low visibility against the surrounding blank area, by setting a contrast to a color component having a gradation close to that of the blank area, it becomes possible to prevent the marks on the cells from appearing as if they are missing by comparison to the background surrounding the two-dimensional code. Furthermore, homogeneity is achieved with cells represented in other colors.

For a display having a color with a high visibility against the surrounding blank area, by setting a contrast to a color component having a gradation far from that of the blank area, it becomes possible to prevent the marks on the cells being too emphasized against the background surrounding the two-dimensional code. Furthermore, homogeneity is achieved with cells represented in other colors.

Another aspect of the present invention relates to a two-dimensional code publishing program for publishing a two-dimensional code expressing a bit string on a plurality of cells arranged two-dimensionally by a combination of gradations of a plurality of color components that constitute a display of each of the plurality of cells, and comprising the step of selecting a combination of the displays of the plurality of cells from a plurality of candidates allocated to the bit string, wherein a display having a color with a low visibility against the blank area surrounding the two-dimensional code and/or a display having a color with a high visibility against the blank area surrounding the two-dimensional code is avoided when selecting the combination of the displays.

An advantage according to this aspect of the present invention is to provide a highly homogenous display throughout the entire cell area by selecting a favorable combination of cell display. Thus, it becomes possible to provide beautiful two-dimensional codes with a high sense of design.

By avoiding a display having a color with a low visibility against the surrounding blank area, it becomes possible to prevent the marks on the cells from appearing as if they are missing by comparison to the background surrounding the two-dimensional code.

By avoiding a display having a color with a high visibility against the surrounding blank area, it becomes possible to prevent the marks on the cells being too emphasized against the background surrounding the two-dimensional code.

Another aspect of the present invention relates to a two-dimensional code decoding program for decoding a bit string from an image data including a two-dimensional code expressing a bit string on a plurality of cells arranged two-dimensionally by a combination of gradations of a plurality of color components that constitute a display of each of the plurality of cells, and comprising the following steps: specifying a position of a mark displayed on each cell surrounded by a blank area based on a contrast between an area of the mark and a surrounding blank area; determining the display of each of the plurality of cells by obtaining color information at the position; and determining presence/absence of each of the plurality of color components that constitute the display of each of the plurality of cells individually by using simultaneously a plurality of color components that constitute the image data.

An advantage according to this aspect of the present invention is that the display of color is determined in consideration of the influences of having other color components, by using the gradations of color components other than the color component that is the determination target. Highly accurate specification of positions and determination of cells is also achieved. Thus, it becomes possible to decode the bit string accurately in a color two-dimensional code.

Furthermore, by performing the determination process for each color component, such processing as conversion of color space of the image data is reduced, therefore reducing the calculation burden for analysis. This leads to reducing of user wait time and other advantages.

Yet another aspect of the present invention relates to a two-dimensional code decoding program for decoding a bit string from an image data including a two-dimensional code expressing a bit string by displays of a plurality of cells arranged two-dimensionally, and comprising the step of selecting a level applied to a parameter relating to deciphering of the two-dimensional code actively according to a decoding process.

An advantage according to this aspect of the present invention is that it becomes possible to decipher the two-dimensional code according to the state of the image by selecting a parameter used for deciphering from a plurality of levels and actively changing the deciphering condition according to the image data.

It is preferable that an element of the present invention is embodied in a program or a combination of programs that runs on a computer. They may also be embodied in special purpose hardware, or a combination of software and hardware As for a computer for executing the program, various kinds of generally used computers such as a personal computer, a work station or a main frame, as well as a computer mounted on an electronic device such as a mobile phone or a PDA may be used. Furthermore, it is possible to use a computer especially designed for executing this program.

Another element of the present invention is a server connected to a network that performs predetermined operations in response to requests from a client terminal. The server may be a generally used server, and is preferred to have such functions as security and backup generally expected of a server.

BRIEF DESCRIPTION OF THE DRAWINGS

The patent or application file contains at least one drawings executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with the description, serve to explain the advantages and principles of the invention. In the drawings:

FIG. 1 is a diagram showing an example of a system configuration of devices according to the present invention;

FIG. 2 is an illustration showing an example of a two-dimensional code according to the present invention;

FIG. 3 is an illustration showing an example of cell arrangement in the two-dimensional code according to the present invention;

FIG. 4 is an illustration showing a partial area of a single color component in the two-dimensional code according to the present invention;

FIG. 5 an illustration showing an example of a marked cell according to the present invention;

FIG. 6 an illustration showing an example of two adjacent cells in horizontal/vertical directions according to the present invention;

FIG. 7 is an illustration showing an example cells allocated as cosmetic marks according to the present invention;

FIG. 15 is an illustration showing a marked cell (single color component) of an image data according to the present invention;

FIG. 16 is a flowchart showing the steps composing a positioning means according to the present invention;

FIG. 17 is an illustration showing a position for obtaining gradation at the time of code area extraction according to the present invention;

FIG. 18 is a diagram showing an example of gradation distribution in a code area according to the present invention;

FIG. 19 is an illustration showing an example of the scanning process of an image using a verification pattern for verification according to the present invention;

DETAILED DESCRIPTION OF THE INVENTION

Figure 8:
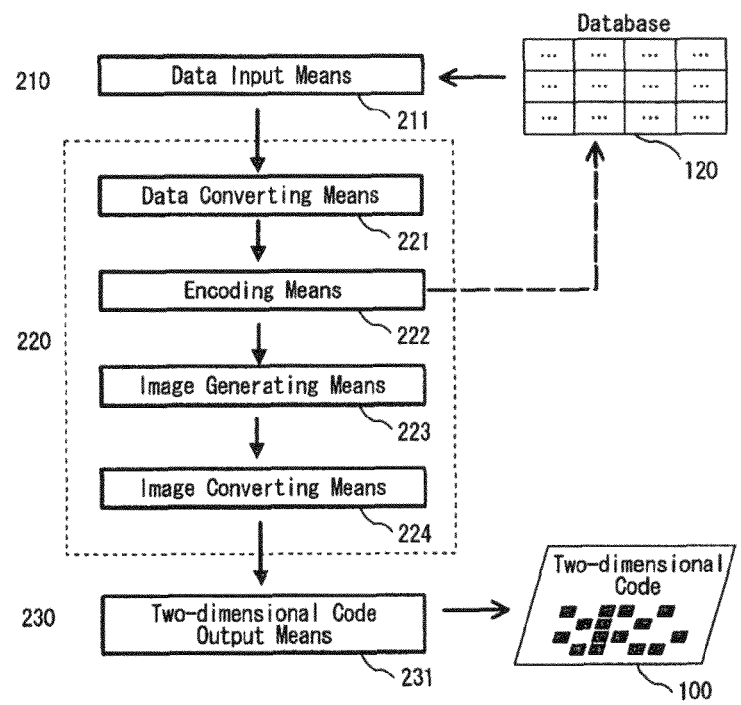
FIG. 8 is a flowchart showing a two-dimensional code publishing process according to the present invention.

A preferred embodiment of the present invention will be now described in detail with reference to the drawings. The described embodiment is to be considered in all respects only as illustrative and not restrictive.

<System Configuration>

FIG. 1 is a diagram showing an example of a system configuration for realizing an embodiment of the present invention. As shown in FIG. 1, the system consists of a server M01, a content registration device M02, and a two-dimensional code obtaining device M03, each having a communication means for connecting to a network.

Existing devices that are generally used may be used as the server M01, the content registration device M02, and the two-dimensional code obtaining device M03. In this embodiment, a personal computer (PC) is used as the content registration device M02. A portable device with an image capturing function, such as a camera, is used as the two-dimensional code obtaining device M03. A portable device may also be used as the content registration device M02. A PC with an image inputting function may also be used as the two-dimensional code obtaining device M03.

The server M01 is capable of simultaneously processing a plurality of functions in response to requests from multiple users. In this embodiment, a single server device performs a plurality of tasks (publishing and decoding of two-dimensional codes, database management, etc). However, it is also possible to deploy multiple servers and distribute the plurality of tasks across them. The server according to the present invention may be a server group consisting of two or more server devices.

<Expected Usage Pattern>

In this embodiment, a plurality of users share electronic data content over a network using two-dimensional codes. For example, user A registers a content in a server and publishes a two-dimensional code at the same time, and then user B decodes the two-dimensional code to specify and obtain the registered content.

In another situation, a plural number of users B may obtain the same content registered in the server. It is also possible for user A and user B to be the same person, obtaining the content he/she has registered.

<Targeted Content>

In this embodiment, content may be any kind of electronic data, such as text information, image information (still image/video data) and audio information.

Text information may be such text data as URLs (Uniform Resource Locator), personal data (address/name/telephone number), memos, e-mail messages, etc. written in any type of format. Text data is represented using character codes such as the EUC code, Shift JIS code, Unicode, etc.

Image information may be still image data in jpeg, bitmap and other data format, or video data in mpeg, wmv, avi and other data format. Audio information may be music data in such data formats as mp3, wav and the like.

Content according to the present invention may also include electronic data created using application software such as word processing software, spreadsheet software, scheduling software, etc. It may also include authentication information such as an ID or a password, cryptographic information that is an encrypted bit string, and computer command codes (execution programs).

<Actions Performed to Content>

In this embodiment, user A selects upon registering the content an action that is performed when the two-dimensional code is decoded. The selected action is recorded in a database stored in the server M01 as an action type. The recorded action type is referred to upon decoding of the two-dimensional code, and performed via a program stored in the server M01.

Chart 1 shows examples of action types as envisaged in this embodiment. Each action type is allocated a number (action type number). In this embodiment, each type of content has a prepared set of a plurality of expected actions.

CHART 1

| Number | Action Type |
| --- | --- |
| A000 | Send to portable device |
| A001 | Display text |
| A002 | Access the net |
| ... | ... |
| ... | ... |
| A011 | Display still image |
| A021 | Play video |
| A031 | Play music |
| ... | ... |
| A100 | Register within server |
| A101 | Register text |
| A102 | Register in bookmark |
| A103 | Register in address book |
| ... | ... |
| A111 | Register in album |
| A121 | Register video |
| A131 | Register music |
| ... | ... |
| A200 | Send to another server |
| A201 | Register text |
| A202 | Register in bookmark |
| A203 | Register in address book |
| ... | ... |
| A211 | Register in album |
| A221 | Register video |
| A231 | Register music |
| ... | ... |

Examples of prepared actions according to this embodiment are explained hereinafter. Each action type may be performed in combination as well.

Action Example 1

Send to Portable Device

The server M01 sends a content to a portable device which is the two-dimensional code obtaining device M03 (A000).

When the content is text information, for example, user B reads it by displaying it on the display of the portable device (A001). User B may also access the information from the described URL using the portable device (A002).

When the content is image information (still image), the image is displayed on the display of the portable device (A011). When the content is a video, the video data is played (A021). When the content is audio information, the music data is played on the portable device (A031).

Action Example 2

Process within the Server

The server M01 registers content within the server M01 itself (A100).

In this embodiment, user B owns a website within the server M01, and registers content on the website. The user B later accesses the website to use the content.

When the content is text information, user B registers the described URL to a bookmark list within the website (A102), for example. User B may also register described personal information (address/name/telephone number) to an address book within the website (A103).

When the content is image information, the still image is registered in an album within the website (A111). When the content is audio information, the music data is registered in a music list within the website (A131).

Action Example 3

Send to Another Server

The server M01 sends a content to another server M11 (A200).

In this example, the website owned by user B is managed on server M11. Here, the server M11 is envisaged to be managed by a different management body (a general network service provider, for example) than the server M01.

The server M01 sends content, as well as the action type to the server M11. The server M11 performs similar actions as the second example, upon reference to the action type. More specifically, the server M11 performs such actions as bookmark registration (A202), address book registration (A203), album registration (A211) and music registration (A231) to the website.

<Database>

The bit string represented as a two-dimensional code may be, for example, a record number allocated to each record in a database. In that case, the two-dimensional code is correspondent to a record in the database.

A database is in a table format, with one row per record and one column per field. Each record has a plurality of fields for recording information. The database in this embodiment is described in a versatile language, SQL, using SQLight, a generally available application. Other applications such as MySQL, PostgreSQL, and Oracle may also be used.

Chart 2 shows an example of the database according to this embodiment. The database includes fields for recording record numbers, header numbers, action types, storage addresses and statuses.

CHART 2

| Record Number | Header Number | Action Type | Storage Address | Status |
|---|---|---|---|---|
| 00...0001 | 00...10 | A001 | file://storage/00...01 | 1 |
| 00...0010 | 00...01 | A202 | http://ikcode.com/... | 1 |
| 00...0011 | 00...11 | A111 | file://storage/00...03 | 1 |
| ... | ... | ... | ... | ... |

The record number field records record numbers (D00). The record numbers are represented by a bit string of binary numbers in this embodiment, but may also be in decimal numbers.

The header number field records header numbers (D10).

The action type field records types of actions to be performed on the content after two-dimensional codes are decoded (Chart 1).

The storage address field records storage addresses of contents. Storage addresses may designate a storage area of the server M01 or a storage area of another server accessible by the server M01.

The status field records publication/suspension statuses of two-dimensional codes. In this embodiment, status=1 signifies that the two-dimensional code can be decoded, and status=0 signifies that it cannot. Status=1 (can be decoded) is recorded when the two-dimensional code has been published and not being suspended. Status=0 (cannot be decoded) is recorded when the two-dimensional code has not been published or is suspended after its publication. Suspension of two-dimensional codes after publication is performed based on usage limitations such as expiration of usage period.

The database may also include other fields than those mentioned above. For example, date/time information such as content registration dates and expiration dates may also be recorded. Other information that may be recorded include log information and storage addresses of files/folders related to contents.

<Display Form of Two-Dimensional Codes>

FIG. 2 illustrates the overall structure of a two-dimensional code according to this embodiment. Here, the cells are arranged on a display surface in a 8×8 matrix. The number of cells is not limited to 8×8, and may also be 12×12, for example.

FIG. 3 illustrates the arrangements of positioning marks 020 and reference marks 030 on a two-dimensional code 101 (FIG. 2). As shown in FIG. 3, the positioning marks 020 and the reference marks 030 are always displayed in a same color in predetermined cell positions. Display of data marks, on the other hand, varies for each two-dimensional code that is generated. Data marks are displayed in each cell (data cell) shown by a dotted line frame in a color according to the bit string.

Arrangement and shape of cells, as well as shape of marks are not limited to those illustrated in the figures. For example, cells may be arrayed in a rectangle shape, with different number of cells in horizontal and vertical directions. The cells may also be arrayed in hexagonal lattices. The marks may be round-shaped.

<Visibility of Cell Display>

A display of each cell (cell display) is expressed by a combination of gradations of a plurality of color components. Gradation according to this embodiment is usually expressed by pixel values of image data. In this embodiment, gradation is composed by two types of displays. More specifically, the two types of displays are a display with a mark having a gradation close to 100% and a display without a mark having a gradation close to 0%.

Cell display having color with low visibility signifies that the color is difficult to distinguish from the color of the blank area. On the other hand, color with high visibility signifies that the color stands out easily from the color of the blank area.

A color having low visibility against the blank area is envisaged to be a color where the combination of gradations of all color components is close to that of the blank area. For example, when the blank area is white (gradations of each color component is 0%, for example), a color close to white (gradations of each color component is close to 0%) is such a color. When the blank area is black (gradations of each color component is 100%, for example), a color close to black (gradations of each color component is close to 100%) is such a color.

For example, yellow against a white blank area, or blue and green against a black blank area may also be difficult to distinguish. Any color with a small brightness difference from white against a white blank area, or any color with a small brightness difference from black against a black blank area may also be difficult to distinguish.

A color having high visibility against the blank area is envisaged to be a color where the combination of gradations of all color components is far from that of the blank area. For example, when the blank area is white (gradations of each color component is 0%, for example), a color close to black (gradations of each color component is close to 100%) is such a color. When the blank area is black (gradations of each color component is 100%, for example), a color close to white (gradations of each color component is close to 0%) is such a color.

For example, blue or red against a white blank area, or yellow against a black blank area may also be such colors. Any color with a large brightness difference from white against a white blank area, or any color with a large brightness difference from black against a black blank area may also be colors with high visibility.

<Data Mark>

FIG. 4 is an enlarged illustration of a part of a two-dimensional code with a single color component. As shown in FIG. 4, cells of each color component are expressed either as a cell with a mark (marked cell 001) or a cell without a mark (blank cell 002).

Colors of marks that compose the display of cells are expressed by a combination of the presence/absence of data marks of each color component. For example, they are expressed by additive color mixture of the three primary colors of light: red, green and blue, or subtractive color mixture of the three primary colors of pigment: cyan, magenta and yellow. Other color components provided by the image format or output device may also be used.

Gradations of each color component are set according to the presence/absence of data marks: 0% for a cell with no data mark and 100% for a cell with a data mark, for example. It can also be set the other way around: 100% for a cell with no data mark and 0% for a cell with a data mark. Hence, bit strings are expressed by allocating the presence/absence of data marks to a plurality of color components.

As shown in FIG. 5, each marked cell 001 are composed of an area where a mark is displayed (marked area 003) and an area where a mark is not displayed (blank area 004). Data marks of each cell are separated from each other by a space.

<Display Selection>

When displaying cells with data marks, they are scanned and evaluated to select a desired display. Thus, display containing high visibility colors/low visibility colors is avoided. When selecting the display, each cell display is evaluated individually or in groups of plural cells, and determined by aggregating the evaluation results of all the cells in the cell area.

Candidates for display selection may be obtained by adding bits to the bit strings expressed by the cells. In this case, the bit strings represented by two-dimensional codes are more redundant than the number of bits (number of records) required for content management in the database. Thus, a plurality of candidates are prepared by varying the added bits.

For example, by adding 10 bits, a favorable combination may be selected from 1024 different candidates. The number of bits to be added is preferably from 4 bits (16 candidates) to 20 bits (1048576 candidates). It is more preferable to add 8 bits (256 candidates) to 15 bits (32728 candidates).

Furthermore, it is preferable to randomize bit strings with added bits by conversion. Encoding or error correction encoding are suitable examples of conversion processing to change combination of displays of plural cells. The conversion processing is preferably performed using rules that are not made public in order to prevent third persons from specifying the used record in the database.

When two or more colors with low visibility/high visibility against the surrounding blank area are arranged consecutively, the sense of design is dramatically disturbed. This may be prevented by avoiding consecutive display of colors with low visibility/high visibility. A way to help avoid this situation is to set the evaluation ratio higher for consecutive displays than a simple sum of individual display evaluation results. Furthermore, this situation may be completely avoided by removing such arrangement from the candidates.

According to this embodiment, a combination of color displays is obtained from two adjacent cells (in horizontal direction/vertical direction) and graded by points, as shown in FIG. 6 Chart 3 shows an example of grading (of two cells) according to this embodiment. The colors (W, C, M, Y, R, G, B, K) represented by the rows and columns of chart 3 correspond to the color displays of the two cells (010P, 010Q) shown in FIG. 6.

CHART 3

|   | W | C | M | Y | R | G | B | K |
|---|---|---|---|---|---|---|---|---|
| W | 0.5 | 0.1 | 0.1 | 0.1 | 0.1 | 0.1 | 0.1 | 0.5 |
| C | 0.1 | 0.3 | 0 | 0 | 0 | 0 | 0 | 0.3 |
| M | 0.1 | 0 | 0.3 | 0 | 0 | 0 | 0 | 0.3 |
| Y | 0.1 | 0 | 0 | 0.3 | 0 | 0 | 0 | 0.3 |
| R | 0.1 | 0 | 0 | 0 | 0.3 | 0 | 0 | 0.3 |
| G | 0.1 | 0 | 0 | 0 | 0 | 0.3 | 0 | 0.3 |
| B | 0.1 | 0 | 0 | 0 | 0 | 0 | 0.3 | 0.3 |
| K | 0.5 | 0.3 | 0.3 | 0.3 | 0.3 | 0.3 | 0.3 | 1.0 |

For a color with low visibility, the effect of display selection is more apparent on cells arranged next to the blank area surrounding the cell area, in other words, edge cells. Therefore, it is preferable to set the evaluation ratio higher for colors with low visibility on the edge cells, so that they may be avoided. Furthermore, they may be completely avoided by removing such colors from the candidates.

In this embodiment, a cell is picked from each of the four sides (upper side, lower side, left side, right side) of the two-dimensional code to obtain and grade its color display. Chart 4 shows an example of grading (of one cell) according to this embodiment.

CHART 4

| W | C | M | Y | R | G | B | K |
|---|---|---|---|---|---|---|---|
| 1.0 | 0 | 0 | 0 | 0 | 0 | 0 | 0.5 |

In this embodiment, verification of the two-dimensional code as a whole is performed using two consecutively arranged cells in the horizontal/vertical direction (FIG. 6) and a cell from one of the sides. All of the cells are scanned, and graded points from the cells are added. The two-dimensional code with less total points is considered more preferable.

By using the grading system shown in chart 3, black is avoided as cell display. In particular, two adjacent cells are avoided from both being displayed in black. Similarly, white is avoided as cell display. In particular, two adjacent cells are avoided from both being displayed in white. Also, two consecutives cells are avoided from being displayed in the same color.

By using the grading system shown in chart 4, cells on the sides are avoided from being displayed in white or black.

<Positioning Mark>

A positioning mark 020 is displayed fixed on a particular cell as basis for the position of the two-dimensional code. Preferably, a two-dimensional code has a plurality of positioning marks 020. As shown in FIG. 3, positioning marks 020 are placed on each of the four corners of the square code area in this embodiment. Image pattern of the positioning marks 020 are the same shape and size as the data marks.

In this embodiment, the positioning marks 020 are displayed in black, and the surrounding blank area is displayed in white. Thus, the positioning marks 020 are displayed in contrast to the surrounding blank area for all color components of output devices.

<Reference Mark>

A reference mark 030 is displayed on a particular cell in a predetermined color to obtain reference information for determining the display of cells. Colors are preferably prepared for all display combinations using all color components used for the display of cells.

In this embodiment, white 030W, cyan 030C, magenta 030M, yellow 030Y, red 030R, green 030G and blue 030B reference marks are displayed near the four corners of the code area, as shown in FIG. 3. Image pattern of the reference marks 030, like the positioning marks 020, are the same shape and size as the data marks.

Here, black reference marks are not displayed. However, the positioning marks 020 according to this embodiment are the same shape and size as the data marks, and therefore the positioning marks 020 also serve as reference marks. A black reference mark may be displayed by preparing image patterns with the same shape, size and color as the positioning marks.

<Cosmetic Mark>

A cosmetic mark is used for deciding a gradation of a predetermined color component of a predetermined cell according to gradations of other color components of the cell and/or display of cells surrounding the cell. Furthermore, display of colors with low visibility against the surrounding blank area and/or display of colors with high visibility against the surrounding blank area are avoided upon deciding the display of the predetermined cell.

By deciding the gradation of a predetermined color component of a predetermined cell as a cosmetic mark, the cells surrounding the cosmetic mark are displayed in a highly homogeneous fashion.

Display of the cosmetic mark is preferably decided independently from the expressed bit string. The gradation of the color component of the cosmetic mark may be decided based on gradation s of other color components of the same cell, for example. In that case, when other color components are set at high gradation, the color component is set at low gradation. When other color components are set at low gradation, the color component is set at high gradation. When cell display is expressed by three color components, the gradation of the color component is decided from the other two color components.

When deciding the display of the cosmetic mark, it is also possible to avoid two adjacent cells from being displayed in the same color. This is achieved by deciding the gradation of the color component according to the display of the surrounding cells. When other color components of the same cell are set at the same gradation as that of the surrounding cells, they are preferably set at a different gradation. When cell display is expressed by three color components, the gradation of the color components are decided from the gradation of other two color components of the same cell as well as the three components of the surrounding cells.

When deciding the display, each of a plurality of gradation candidates allocated to the color component is evaluated individually to select a favorable gradation. For example, when the two gradation candidates are "with mark (100%)" and "without mark (0%)", evaluation is performed individually for both candidates.

In this embodiment, display of the cosmetic mark is decided according to the presence/absence of the marks of other color components in the cell. The decision is also based on the combination of display of the surrounding cells. The presence/absence of the cosmetic mark is evaluated individually, and the favorable one is selected to decide the display.

The candidates are evaluated using the combinations of gradations of the cell and surrounding cells. Evaluation may be performed by referring to a table prepared beforehand, for example. Combinations of gradations and evaluation for each combination, for example, are stored in the table.

In this embodiment, combinations of the display of the cell with the cosmetic mark and the display of the adjacent cell are graded by points using the table shown in Chart 3. The grading is performed for combinations with all four adjacent cells, and graded points are added. Combinations with less total points are considered more preferable. The adjacent cells are placed consecutively in the horizontal or vertical directions, and combinations of display of colors are obtained for evaluation.

The presence/absence of the cosmetic mark, however, may also be selected without evaluating the surrounding cells. For example, "with mark" may be selected when other color components exist in the cell, and "without mark" may be selected when no other color components exist.

The cell/color ingredients are preferably arranged so that they are evenly dispersed throughout the entire cell area. In other words, the cells with the cosmetic mark are not placed consecutively, and at least one cell exists between them. It is preferable that cosmetic marks are allocated to a color component that is unique in the cell. Such arrangement may lead to higher effect in allocating a fixed number of cosmetic marks.

As shown in FIG. 7, cosmetic marks are allocated to a part of the data cells in this embodiment. This way, the cosmetic marks are mixed with the data marks and are not placed adjacent to each other. Furthermore, a single color component is allocated in one cell. A plurality of color components are allocated evenly. In this embodiment, a total of 18 cosmetic marks are placed, with six marks allocated to each of the three color components of cyan 040C, magenta 040M and yellow 040Y The color components are arranged so that they are dispersed within the plane.

<Gradation Correction of Cell Display>

For cells having a color with low visibility/high visibility, gradation correction may be performed according to the display of cells. For example, gradation is set by increasing gradation to a color with low visibility and by decreasing gradation to a color with high visibility. Gradation is preferably set independently from the expressed bit string. Gradation of predetermined color components are adjusted within a range that will not cause errors in determining the display of cells when decoding the two-dimensional code For example, for a color with low visibility, gradation contrast between the cell and the surrounding blank area may be set at 5 to 30%. More preferably, the difference in contrast is set at 5 to 20% for determination accuracy at the time of decoding.

For a color with high visibility, the contrast between the cell and the surrounding blank area may be set at 70 to 95%, when the maximum difference in contrast is 100%. More preferably, the difference in contrast is set at 80 to 95% for determination accuracy at the time of decoding.

In setting the gradation, color components with gradations close to that of the surrounding blank area is chosen when the color is of low visibility. Color components with gradations distant from that of the surrounding blank area is chosen when the color is of high visibility.

In this embodiment gradation correction is performed to predetermined colors of marks displayed on cells. Target gradation is decided according to the color display of the cell, in other words, the presence/absence of marks of other color components on that cell.

Chart 5 shows the gradations of each color component used for each color in this embodiment.

CHART 5

| W | C | M | Y |
|---|---|---|---|
| (0.1, 0.1, 0.1) | (1, 0, 0) | (0, 1, 0) | (0.1, 0.1, 1) |
| K | R | G | B |
| (1, 1, 1) | (0, 1, 1) | (1, 0, 1) | (1, 1, 0) |

In this embodiment, gradation correction is performed to colors that are difficult to distinguish (white, yellow, and the like) from the surrounding blank area (white) by increasing the gradation by a preset rate. As shown in FIG. 5, when display of a cell is in white, gradations of each of the color components of the cell are increased by 10%. In other words, gradations of cyan, magenta and yellow components are increased from (0, 0, 0) to (0.1, 0.1, 0.1). Similarly, when display of a cell is in yellow, gradations of color components other than yellow are increased by 10% from (0, 0, 1) to (0.1, 0.1, 1).

It is also effective to perform gradation correction to colors that are difficult to distinguish (black and the like) from other cells by decreasing the gradation. For example, when display of a cell is in black, gradations of each of the color components may be decreased by 5 to 20%. The gradation of black (1, 1, 1) is decreased by 10% for each color component to (0.9, 0.9, 0.9).

<Publishing/Decoding Processes of Two-Dimensional Codes>

A process for realizing this embodiment consists of a two-dimensional code publishing process that processes publishing of two-dimensional codes and a two-dimensional code decoding process that processes decoding of two-dimensional codes.

In the two-dimensional code publishing process, content is stored in a storage area of the server M01 upon request from user A operating the content registration device M02. The server publishes a two-dimensional code 100 in association with the storage address of the content, and manages the association using a database (Chart 2). The user A receives the two-dimensional code 100 and uses it according to his/her objectives.

In the two-dimensional code decoding process, user B obtains an image data of the two-dimensional code 100 using the two-dimensional code obtaining device M03 and sends the image data to the server M01. The server M01 analyzes the image data, and specifies the content associated to the two-dimensional code 100 referring to the database. The specified content is then used by user B.

<Two-Dimensional Code Publishing Process>

FIG. 8 shows a two-dimensional code publishing process 200 according to this embodiment. The two-dimensional code publishing process 200 consists of a data input part 210, a two-dimensional code generating part 220 and a two-dimensional code output part 230.

<Data Input Part>

The data input part 210 obtains a bit string and inputs the bit string to the two-dimensional code generating part 220. The data input part 210 according to this embodiment is composed of a data input means 211 (FIG. 8). The data input means 211 is realized by executing a program which is prepared beforehand in the server M01. The bit string according to this embodiment is a group of bits which are the smallest units of information a computer can handle.

The data input means 211 obtains a record number D00 from the database as the bit string. The record number D00 specifies a record in the database.

In this embodiment, record numbers D00 generates bit strings in order from a smaller number, and allocate it in the database to be recorded. Unused record numbers D00 are selected in order at the time of publishing of the two-dimensional code. The published two-dimensional codes are managed using the database in association with the record numbers D00.

<Two-Dimensional Code Generating Part 220>

The two-dimensional code generating part 220 generates the image data of the two-dimensional code based on the bit string received from the data input part 210. The two-dimensional code generating part 220 then transfers the image data to the two-dimensional code output part 230.

As shown in FIG. 8, the two-dimensional code generating part 220 according to this embodiment is composed of a data converting means 221, an encoding means 222, an image generating means 223 and an image converting means 224. These means are realized by executing a program which is prepared beforehand in the server M01.

The data converting means 221, the encoding means 222, the image generating means 223 and the image converting means 224 are described in detail hereinafter.

<Data Converting Means>

Figure 9:
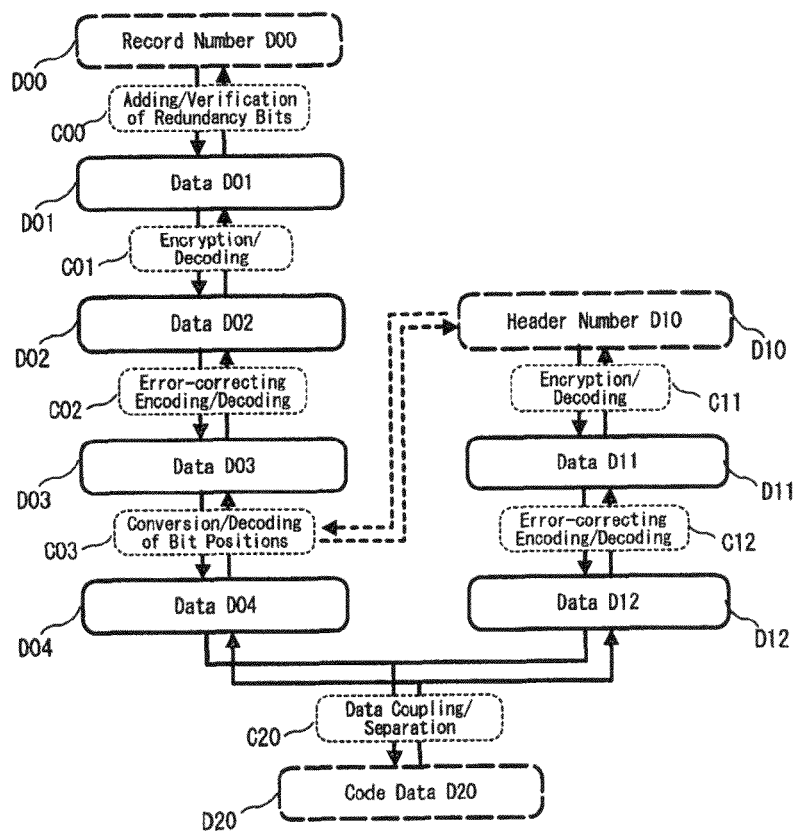
FIG. 9 is a flowchart showing a data conversion flow according to the present invention.

The data converting means 221 obtains a code data D20 to embed in the two-dimensional code based on the record number D00 of the database. FIG. 9 is a flowchart showing a flow for converting the record number D00 and obtaining the code data D20. The flow is described in detail hereinafter.

[Adding of Redundancy Bits C00]

The record number D00 (decimal number) is converted to a binary bit string, and then added redundancy bits via processing C00 to generate data D01. In this embodiment, the redundancy bits are allocated to a plurality of cell display candidates. The bit string selected for cell display is recorded in a database 120. Data obtained from decoding is compared with the record in the database 120 to detect any errors. The added redundancy bits consist of a fixed number of digits. In this embodiment, the 10 upper bits of the data D01 are allocated as the redundancy bits.

[Encryption C01]

Encryption processing C01 is performed on the data D01 to generate data D02. Examples of encryption techniques that may be used here are DES (Data Encryption Standard), Triple DES and AES (Advanced Encryption Standard).

[Error-Correcting Code C02]

Error-correcting encoding processing C02 is performed on the data D02 to generate data D03. Examples of an error-correcting code that may be used here are the BCH (Bose-Chaudhuri-Hocquenghem) code, the extended BCH code and the Reed Solomon code. The error-correcting code is prepared in a predetermined combination (n, k, d) of a total number of code bits n, a number of information bits k and a minimum value of a humming distance d.

[Conversion of Bit Positions]

Bit position conversion processing C03 is performed on the data D03 to generate data D04. Positions of each bit in the data D03 are switched. For the bit position conversion processing according to this embodiment, a plurality of conversion rules are prepared and stored in the server M01 in association with header numbers D10. A predetermined randomization algorithm is used as the conversion rule of bit positions.

[Header Number D10]

A header number D10 specifies the conversion rule used in the bit position conversion processing C03. It is to be noted that in this embodiment, a part of the bits of the header number D10 is allocated for identification of the conversion rule. The remaining bits are allocated for management of version numbers, and are fixed to ensure future scalability.

[Encryption C01]

Encryption processing C11 is performed on the header number D10 to generate data D11. Public key encryption processing, which is a known technique, is used in the encryption processing C11 according to the present invention.

[Error-Correcting Code C02]

Error-correcting encoding processing C12 is performed on the data D11 to generate data D12.

[Data Coupling C20]

Data D04 and data D12 obtained through the above processes are coupled, and code data D20 is obtained as a result. In this embodiment, positions of each bit are randomly allocating when coupling the two bit strings. The coupling rule, however, is fixed and stored in the server M01.

<Encoding Means>

Figure 10:
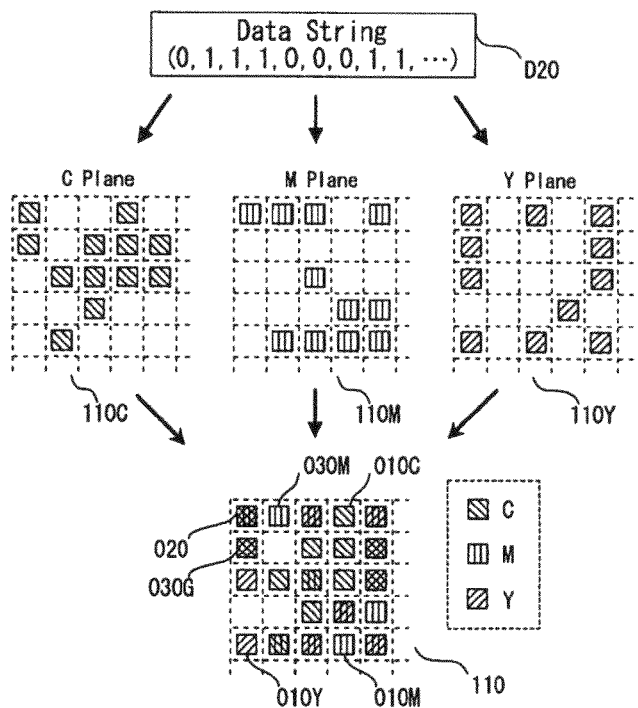
FIG. 10 is a conceptual diagram of a cell display deciding mechanism according to the present invention.

An encoding means 222 decides the color display of each cell based on code data D20 obtained from the data converting means 221. FIG. 10 is a conceptual diagram of a cell display deciding mechanism according to this embodiment.

As shown in FIG. 10, each bit of code data D20 are allocated to cyan, magenta and yellow color components by a predetermined rule. Also, bits of each color component are allocated to the cells to decide the presence/absence of a mark on each cell. "1" of each bit corresponds to "with mark" and "0" corresponds to "without mark".

The presence/absence of the marks of each color component (110C, 110M, 110Y) are overlaid to decide the color display (110) of each cell. In other words, cyan C, magenta M and yellow Y are combined in order to decide not only cyan C, magenta M and yellow Y, but also red R (=M+Y), green G (=C+Y), blue B (=C+M) and black K (=C+M+Y) as color display. White W without any of the color components is decided as well.

The encoding means 222 extracts a plurality of candidates of cell display. The encoding means 222 then selects a favorable display from the candidates using a predetermined selection rule that is not made public. The bit string that specifies the selected display is recorded in a predetermined bit of data D01 as well as in the corresponding record within the database 120 (FIG. 8).

The encoding means 222 also decides whether to display a cosmetic mark on some of the predetermined data cells. The presence/absence of cosmetic marks are decided according to the other color components of the cell and/or display of surrounding cells.

The two-dimensional code expresses a bit string (code data D20) by display of cells. The number of bits of code data D20 is calculated using the following formula: (number of bits of the code data)=(total number of cells−number of positioning cells−number of reference cells)×(number of color components)−(number of cosmetic cells).

In this embodiment, out of a total of 64 cells (=8×8 cells) of the two-dimensional code, four cells are allocated as positioning marks 020, seven cells (W, C, M, Y, R, G, B) are allocated as reference marks 030 and the remaining 53 are allocated as data cells.

A maximum of 159 bits by combining three color components (=53 cells×3 color components) may be allocated to code data D20. However, in this embodiment, some of the bits (18 bits) are allocated as cosmetic marks and the remaining 141 bits (=159 bits−18 bits) are allocated to code data D20.

<Image Forming Means>

An image forming means 223 generates an image data constituted by a two-dimensional array (Row, Column) of pixels, based on the color display of each of the cells obtained by encoding means 222. In this embodiment, image data of 50×50 pixels is generated.

Each pixel of the image data has a value between 0 and 1 for (cyan C, magenta M, yellow Y) color components. The color of each pixel is expressed by a combination of the three color components. For example, cyan is expressed as (1, 0, 0), red is expressed as (0, 1, 1) and black is expressed as (1, 1, 1).

Figure 11:
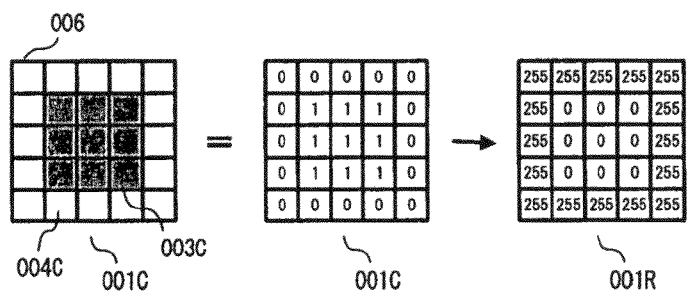
FIG. 11 is an illustration showing a marked cell (single color component) of an image data according to the present invention.

FIG. 11 shows a marked cell 001C as an example of image data with a single color component (cyan C). As shown in FIG. 11, the marked cell 001C in this embodiment is composed of 5×5 pixels. The center 3×3 pixels is considered a marked area 003C, and an area surrounding the marked area 003C in a width of one pixel is considered a blank area 004C. In each of the pixels 006, "1" is allocated for the marked area, and "0" is allocated for the blank area.

The image forming means 223 corrects gradations of each color component for cells with a predetermined color in the marked area 003C. In this embodiment, white and yellow cells are corrected. Target cells for correction are detected by verifying the combinations of presence/absence of each color component. Gradation of each pixel is set according to the predetermined rules shown in Chart 5 for the detected cells.

Here, for white cells (0, 0, 0) in the marked area, values of each color component are set at (0.1, 0.1, 0.1). For yellow cells (0, 0, 1), values of each color component are set at (0.1, 0.1, 1).

Figure 12:
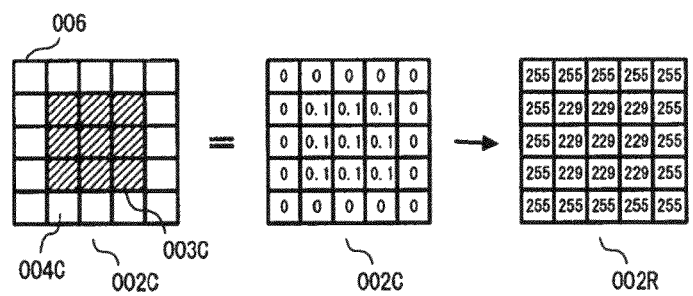
FIG. 12 is an illustration showing a blank cell (single color component) of an image data according to the present invention.

FIG. 12 shows a single color component (cyan C) that does not have a mark on white and yellow cells. As shown in FIG. 12, gradations of white and yellow cells (blank cell 002C) in the marked area 003C are corrected by allocating a gradation of 0.1.

<Image Converting Means>

The image converting means 224 converts the image data obtained from the image forming means 223 to a generally used image format. In this embodiment, the image data is converted to GIF format. The image data may be converted to other image formats such as PPM (Portable Pix Map), bitmap, JPEG as well.

The above image formats generally have gradation values in multiple levels for each color component, and express colors in (red R, green G, blue B) color components. In this embodiment, the image data is converted to an image format that uses 24-bit RGB colors (256 gradations for each RGB color).

The values of each pixel are converted in following ways, for example: cyan (1, 0, 0) to (0, 255, 255), red (0, 1, 1) to (0, 0, 255) and black (1, 1, 1) to (0, 0, 0). White and yellow with color adjustments are converted from (0.1, 0.1, 0.1) to (229, 229, 229) and from (0.1, 0.1, 1) to (229, 229, 0), respectively.

In the example of FIG. 11 with a single color component (cyan C), the values of CMY components of each pixel are converted to RGB component gradations. More specifically, the marked area is converted from cyan component "1" to red component "0", and the blank area is converted from cyan component "0" to red component "255". In the example of FIG. 12 of color correction (cyan component) of blank cells, the marked area is converted from cyan component "0.1" to red component "229".

<Two-Dimensional Code Output Part>

The two-dimensional code output part 230 outputs the image data of the two-dimensional code generated by the two-dimensional code generating part 220 to the content registration device M02.

As shown in FIG. 8, the two-dimensional code output part 230 according to this embodiment is composed of a two-dimensional code output means 231. The two-dimensional code output means 231 is realized by executing a program which is prepared beforehand in the server M01. Existing communication techniques are used for the communication of the two-dimensional code output means 231

In this embodiment, user A displays the two-dimensional code received by content registration device M02. The two-dimensional code can be displayed in any manner.

Here, the two-dimensional code is envisaged to be displayed on an image display device connected to a computer or to be output by an image forming device to be displayed on a sheet-like recording media or a solid object surface.

An image display device generally forms an image by expressing pixels by luminance of luminescent materials. A liquid crystal display (160 dpi, 32-bit RGB colors, for example) is preferable as the image display device according to this embodiment. Other display devices such as a CRT (Cathode Ray Tube) display or a plasma display may also be used.

The two-dimensional code is displayed on a web page and made public on the internet, and is displayed on a display of the PC that accessed the web page, for example. The two-dimensional code may also be displayed on a TV display by setting a display area for two-dimensional codes in a TV broadcast video.

An image forming device generally forms an image by expressing pixels by outputting ink or toner on a recording media. An inkjet output machine (600 dpi, for example) is preferable as the image forming device according to this embodiment. Other image forming devices such as an electrophotographic output machine or a printing machine may also be used.

The two-dimensional code is output on paper using an inkjet printer connected to a PC, for example. The two-dimensional code may also be output on such printed material as a flyer, a name card or wrapping paper. It may also be output on a surface of a manufactured solid product.

<Two-Dimensional Code Publishing Flow>

Figure 13:
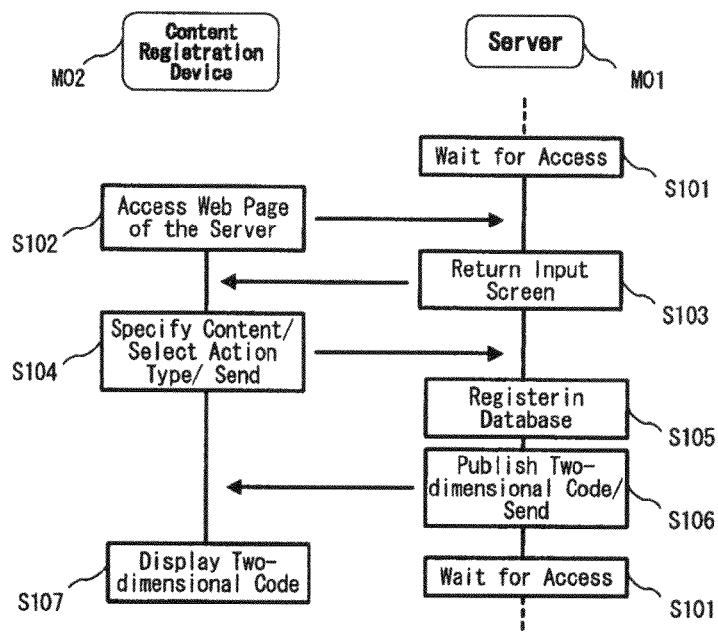
FIG. 13 shows an example of the communication procedures between devices in the two-dimensional code publishing process according to the present invention.

FIG. 13 shows an example of operations of the server M01 and the content registration device M02, and the communication between the server M01 and the content registration device M02 in a two-dimensional code publishing flow according to this embodiment.

S101: The server M01 waits for access from the content registration device M02.

S102: The content registration device M02 accesses an URL (web page) of the server M01 upon instruction from user A.

S103: The server M01 returns an input screen when accessed by the content registration device M02.

S104: User A specifies a content and an action type to be performed on the content on the input screen. The content registration device M02 sends the content and the action type to the server M01.

S105: The server M01 stores the received content to a storage area. The server M01 also allocates a record in the database to the content, and stores a storage address (ex. "file://storage/00 . . . 01") of the content and the selected action type to a predetermined field.

S106: The server M01 converts a record number D00 of the record to a code data D20, and generates an image data of a two-dimensional code representing the code data. The server M01 also sends the image data to the content registration device M02. These operations of the server M01 are realized by the two-dimensional code publishing process.

S107: After the content registration device M02 receives the image data of the two-dimensional code, user A displays the two-dimensional code to use it.

Communication protocols of the server M01 and the content registration device M02 are not limited to a specific protocol. This embodiment is realized by HTTP, and http daemon (http service) is used for S101, and GET command and its response are used for S102 and S103. POST command and its response are used for S104 and S106. The input screen returned in S103 is described in HTML (as well as JavaScript (registered trademark) and other languages). S105 and S106 are realized by CGI programs and servlets on the server side.

<Two-Dimensional Code Decoding Process>

Figure 14:
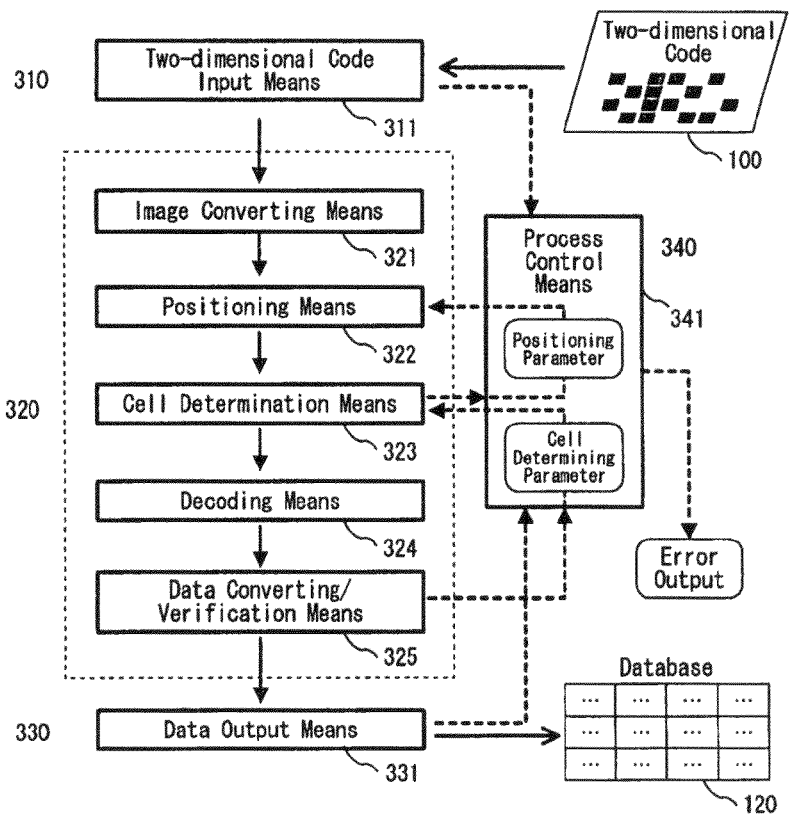
FIG. 14 is a flowchart showing a two-dimensional code decoding process according to the present invention.

FIG. 14 shows a two-dimensional code decoding process 300 according to this embodiment. The two-dimensional code decoding process 300 consists of a two-dimensional code input part 310, a two-dimensional code deciphering part 320 and a data output part 330.

<Two-Dimensional Code Input Part>

The two-dimensional code input part 310 receives and obtains the image data of the two-dimensional code from the two-dimensional code obtaining device M03, and transfers the image data to the two-dimensional code deciphering part 320.

As shown in FIG. 14, the two-dimensional code input part 310 according to this embodiment is composed of a two-dimensional code input means 311. The two-dimensional code input means 311 is realized by executing a program which is prepared beforehand in the server M01.

The image data is obtained by user B using the two-dimensional code obtaining device M03, and then sent to the server M01 via a network. The server M01 stores the received image data in a memory within the server M01. Existing communication techniques are used for the communication between the server M01 and the two-dimensional code obtaining device M03.

<Two-Dimensional Code Obtaining Device>

The two-dimensional code obtaining device M03 according to this embodiment obtains digital data using a CCD (Charged Coupled Device). A portable device having a camera function (240×320 pixels, 24-bit RGB colors, for example) is preferable as the two-dimensional code obtaining device M03. A flatbed scanner (600 dpi, 24-bit RGB colors, for example) may also be used.

When the image of the two-dimensional code is captured by a camera of a portable device, the image data of the two-dimensional code may be sent using a communication means of the portable device. When the two-dimensional code is scanned by a flatbed scanner, the image data may be sent using a communication means of a PC connected to the flatbed scanner.

<Obtained Image Data>

The image data handled in this embodiment is composed of pixels each of which is constituted by a plurality of color components and has gradation in multiple levels. Therefore, colors of the image data are expressed by an additive color mixture of (red R, green G, blue B) color components, for example. Image format of the image data is not limited. JPEG, GIF, PPM, Bitmap formats are some examples of image format that may be used here.

FIG. 15 shows an example of the image data with a single color component (red R). A marked cell 001R is shown in FIG. 15.

As shown in FIG. 15, the marked cell 001R in the image data is varied from the image (FIG. 11) at the time of two-dimensional code generation due to noise from input or output. Therefore, for each pixel 007, the gradation is approximately from 28 to 128 in the marked area and approximately from 102 to 204 in the blank area.

<Two-Dimensional Code Deciphering Part>

The two-dimensional code deciphering part 320 deciphers the two-dimensional code from the image data obtained by the two-dimensional code input part 310. The two-dimensional code deciphering part 320 then transfers a bit string obtained by the deciphering process to the data output part 330.

As shown in FIG. 14, the two-dimensional code deciphering part 320 according to this embodiment is composed of an image converting means 321, a positioning means 322, a cell determination means 323, a decoding means 324 and a data converting/verification means 325. The means are realized by executing a program which is prepared beforehand in the server M01.

The image converting means 321, the positioning means 322, the cell determination means 323, the decoding means 324 and the data converting/verification means 325 are described in detail hereinafter.

<Image Converting Means>

Specification of positions of each cell and obtaining of color information at each position are preferably performed individually by analyzing different image data suited for each operation.

The image converting means 321 converts the image data input from the two-dimensional code input part 310 into a data suited for analysis by the positioning means 322 and the cell determination means 323. As a result of the conversion, a positioning image data that will be used by the positioning means 322 and a cell determination image data that will be used by the cell determination means 323 are obtained. The obtained image data are stored in a memory area of the server M01.

Each pixel of the cell determination image data has a value between 0 and 1 for CMY color components. When the image data before conversion is expressed by 24-bit RGB colors, 256 gradations for each color components of (red R, green G, blue B) are converted into (cyan C, magenta M, yellow Y) values between 0 and 1.

The conversion is performed using Formula 1. Formula 1 shows a conversion of values of each color component in a pixel (Row, Column).

$$(C_{(r,c)}, M_{(r,c)}, Y_{(r,c)}) = \left( \frac{255 - R_{(r,c)}}{255}, \frac{255 - G_{(r,c)}}{255}, \frac{255 - B_{(r,c)}}{255} \right)$$ [Formula 1]

In the example of FIG. 15 with a single color component (cyan R), gradations of RGB components in each pixel are converted to CMY values. As a result, the values are approximately from 0.5 to 0.9 in the marked area and approximately from 0.2 to 0.6 in the blank area.

The positioning image data is obtained by performing further processing on the cell determination image data. A plurality of color components are preferably converted so that they are combined in each pixel to hold just one value. In this embodiment, CMY components are combined so that they are converted to a sole maximum value D.

The conversion process is performed using Formula 2. In Formula 2, Max (x, y, z) is a function for selecting the maximum value from three values (x, y, z).

$$D_{(r,c)} = \text{Max}(C_{(r,c)}, M_{(r,c)}, Y_{(r,c)})$$ [Formula 2]

<Positioning Means>

The positioning means 322 detects the positioning mark on the positioning image data input from the image converting means 321, and specifies the position of the two-dimensional code.

As shown in FIG. 16, the positioning means 322 according to this embodiment is composed of a code area extraction step P101, an image information obtaining step P102, a code area scanning step P103 and a positioning mark selecting step 104. An execution program is prepared beforehand in the server M01 as a means to realize these steps.

The steps of the positioning means 322 are described in detail hereinafter.

<Code Area Extraction Step>

In the code area extraction step P101, an area including the whole two-dimensional code is extracted from the image data. At that time, processing is performed on the positioning image data obtained in the image converting means 321. The code area extraction step P101 according to this embodiment is performed in the below method.

In the code area, there is a contrast between the marks on the cells arranged in a lattice pattern and the blank area. On the other hand, it is likely that there is low contrast within the area surrounding the code area. Thus, an area consisting of a code area with high contrast between the marked area and the blank area and a blank area with low contrast is extracted.

In this embodiment, Formula 3 is used for determination of the code area.

$$Jc = V_c - P_1 \times V_s$$

$$V_c = F_{mc}(D_{max} - D_{min})$$

$$V_s = F_{ms}(D_{max} - D_{min})$$ [Formula 3]

In Formula 3, Vc and Vs represent the amount of contrast between marked area and blank area in the code area and the surrounding blank area, respectively. Using Formula 3, an area where the value of an index Jc is large is considered the desired code area.

P1 is a positioning parameter, and is managed by a process control means 341.

As shown in FIG. 17 (enlarged image), Vc and Vs are calculated by obtaining a plurality of gradations from an area envisaged to be a cell area. Gradations are obtained from a marked area 031 and a blank area 032 (middle area between marks). Dmax and Dmin represent the maximum value and the minimum value of the gradations obtained from a cell area 030. The function Fmc ( ) shows the average value of the cells (64 cells in total) within the code area. The function Fms ( ) shows the average value of the cells (36 cells in total) within the blank area envisaged at a surrounding width of one pixel.

Image data of the code area is scanned while calculating the index Jc of Formula3, and an area where the value of Jc is the largest is extracted. At that time, the envisaged size of the cells shown in FIG. 17 is reduced/enlarged so that they correspond to the display size of the two-dimensional code within the image data. The positions of pixels at four corners (upper left, upper right, lower left, lower right) of the extracted code area are specified and used for processing in other steps.

<Image Data Obtaining Step P102>

In the image information obtaining step P102, image information is obtained from the area extracted in the code area extraction step P101. The processing of this step is performed on the positioning image data obtained in the image converting means 321. The image information obtaining step P102 according to this embodiment is performed in the below method.

The image information according to this embodiment is calculated based on a gradation distribution of the code area. FIG. 18 shows an example of the gradation distribution according to this embodiment. In FIG. 18, the horizontal axis signifies the gradation and the vertical axis signifies the frequency of each gradation. In this embodiment, the gradations are in increments of 0.02. The frequency of the gradation 0.5 is within the range between 0.50 and 0.52, for example.

As shown in FIG. 18, gradation distribution usually has two peaks corresponding to the marked area and the blank area. For the image information according to this embodiment, gradations of each peak are first obtained to set indexes Mm and Mv for the marked area and the blank area, respectively.

<Code Area Scanning Step P103>

In the code area scanning step P103, the area extracted in the in the code area extraction step P101 is scanned to detect an image pattern of a positioning mark. The processing of this step is performed on the positioning image data obtained in the image converting means 321. The code area scanning step P103 according to this embodiment is performed in the below method.

Figure 20:
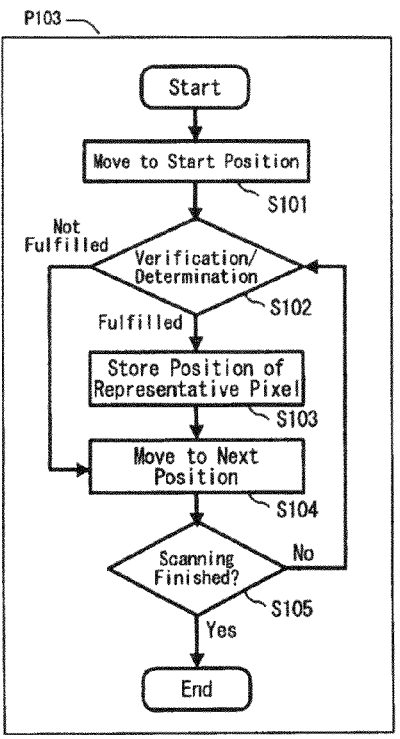
FIG. 20 is a flowchart showing a code area scanning process according to the present invention.

As shown in FIG. 19, image data is scanned using a verification pattern 008 for verification. When the image data matches the verification pattern, position of a representative pixel is stored. In this embodiment, the upper left pixel of the envisaged marked area is chosen as the representative pixel. Image patterns within the image data are detected in this way. This series of processes is performed according to the procedure shown in the flowchart of FIG. 20.

The verification pattern 008 is composed of a marked area and a blank area surrounding the marked area. Here, the verification pattern is a pattern of 5×5 pixels, with a marked area of 3×3 pixels in the middle with a blank area of a width of one pixel surrounding the marked area (FIG. 19).

Figure 21:
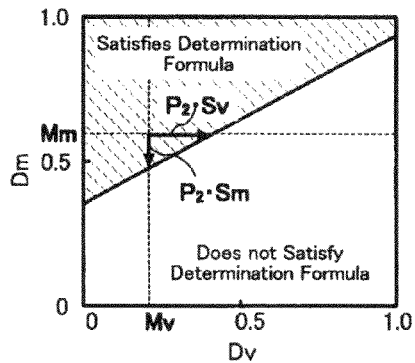
FIG. 21 is a diagram showing an example of determination areas by a determination formula.

Determination of the verified image is performed by calculating the gradation averages (Dm and Dv) from the marked area and the blank area, and assigning the average values in a determination formula (Formula 4). As shown in FIG. 21, the image data is considered to match the desired image pattern when the values satisfy the determination formula (Formula 4).

$$\frac{D_v - M_v}{P_2 S_v} - \frac{D_m - M_m}{P_2 S_m} < 1 \quad \text{[Formula 4]}$$

A known formula, $D = \Sigma di/n$ is used to calculate the average value D. Here, "n" represents the number of pixels, "I" represents the pixel number, "di" represents the gradation of the pixel i, and "$\Sigma$" represents the sum of pixels in each area.

Mm and Mv are variables corresponding to the image data. The image information (Mm and Mv) obtained in the image information obtaining step P102 are used here.

Sm and Sv are variables expressing acceptable levels. In this embodiment, the formula, Sm=Sv=Mm−Mv is used.

P2 is a positioning parameter, and is managed by the process control means 341.

<Positioning Mark Selecting Step 104>

In the positioning mark selecting step 104, a positioning mark is selected from the marks detected in the code area scanning step P103. Thus, the specified position is obtained as position data. The positioning mark selecting step 104 according to this embodiment is performed in the below method.

As shown in FIG. 8, the positioning marks 020 according to this embodiment are placed at the four corners of a square code area. The positioning mark selecting step 104 selects the placement of the four corners from the aggregate of detected positions including the positioning mark.

Figure 22:
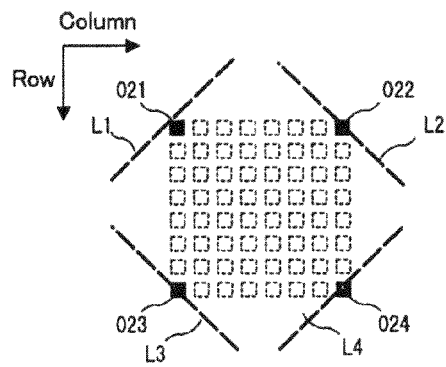
FIG. 22 is an illustration showing an example of straight lines for selecting the positioning marks according to the present invention.

As shown in FIG. 22, the four corners are selected by envisaging straight lines (L1 to L4) passing through the detected positions, two of which having a gradient of −1 (135 degrees from the column axis), and other two having a gradient of 1 (45 degrees from the column axis). Then maximum/minimum points of the row axis intercept are selected from the aggregate of detected positions.

In FIG. 12, line L1 has the smallest "Row coordinate+Column coordinate" value, line L2 has the smallest "Row coordinate−Column coordinate", line L3 has the largest "Row coordinate−Column coordinate" value and line L4 has the largest "Row coordinate+Column coordinate" value. Upper left position 021, upper right position 022, lower left position 023 and lower right position 024 are selected from the respective lines.

The position data according to this embodiment consists of pixel positions of the positioning marks on the selected four corners. In other words, upper left position 021 (Rtl, Ctl), upper right position 022 (Rtr, Ctr), lower left position 023 (Rbl, Cbl) and lower right position 024 (Rbr, Cbr) constitute the position data in FIG. 22.

<Cell Determination Means 323>

The cell determination means 323 determines and specifies displays of each cell using the position data obtained by the positioning means 322 on the cell determination image data input from the image converting means 321.

Figure 23:
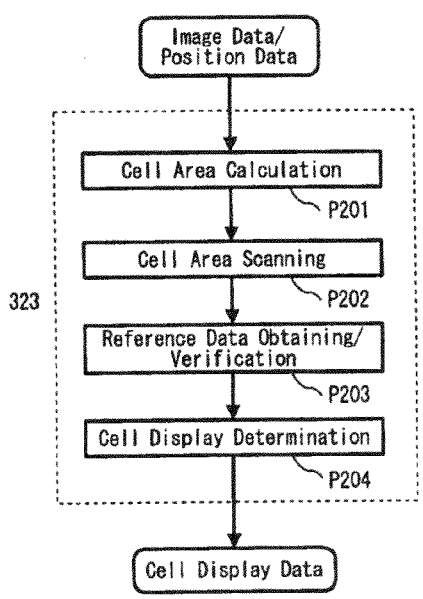
FIG. 23 is a flowchart showing the steps composing a cell determination means according to the present invention.

As shown in FIG. 23, the cell determination means 323 according to this embodiment is composed of a cell area calculation step P201, a cell area scanning step P202, a reference data obtaining/verification step P203 and a cell display determination step P204. An execution program is prepared beforehand in the server M01 as a means to realize these steps.

<Cell Area Calculation Step P201>

In the cell area calculation step P201, each cell area is calculated using the position data obtained in the positioning means 322. The cell area calculation step P201 according to this embodiment is performed in the below method.

On the cells arranged in a lattice pattern, a line segment connecting the positioning marks on the four corners is divided equally by the number of cells to calculate a cell area positioned on the side connecting the four corners. Then, a line segment connecting the cells on opposite sides is calculated in the Row and Column directions to calculate a cell area positioned inside the lattice. The upper left position within the cell area is considered the representative pixel in specifying the cell area. The value is rounded off to an integer.

<Cell Area Scanning Step P202>

In the cell area scanning step P202, gradations of cells are obtained for each color component by scanning each cell area of the image data. The cell area obtained in the cell area calculation step P201 is used. The cell area scanning step P202 according to this embodiment is performed in the below method.

In the cell area scanning step P202 according to this embodiment, cell areas are scanned using a verification pattern 008 for verification, similarly to the code area scanning step P103 of the positioning means 322 (FIG. 19). Positions of the marks of each cell are detected this way. Furthermore, an index (cell index) for determining the presence/absence of mark in a cell is obtained at the detected positions of marks. The difference between the gradation Dm of the marked area and the gradation Dv of the blank area is used as the cell index.

In this embodiment, cell indexes (cyan C, magenta M, yellow T) are obtained for each color component. Formula 5 is used for the detection of the positions of marks to obtain cell indexes (Jmc, Jmm, Jmy). The obtained cell indexes (Jmc, Jmm, Jmy) are stored in a memory area within the server M01.

$$(Jm_c, Jm_m, Jm_y) = ([D_m - P_3 \times D_v]_{Cmax}, [D_m - P_3 \times D_v]_{Mmax}, [D_m - P_3 \times D_v]_{Ymax})$$ [Formula 5]

Dm and Dv are average values of gradations in the marked area and the blank area, respectively. Using these values, the position where the value of Dm−P3×Dv is the largest is considered the position of the mark.

P3 is a cell determining parameter, and is managed by the process control means 341. A plurality of levels (0 to 1.0) that specify the weight of Dm and Dv are prepared as the cell determining parameter.

A determination suited to the condition of the image is possible by selecting a correcting condition of cells from the plurality of levels. For example, when density distribution (ex. edge area is dark) exists within the image plane, effects of the distribution may be reduced by applying stronger correction by the surrounding blank area. When an outline of a mark on a cell is vague because the image is out of focus, for example, reduction of sensitivity may be prevented by applying weaker correction.

The scanning range is an area with the position of the mark envisaged from the cell area calculation step P201 as the center, and half of the distance from the center to adjacent marks in the row and column directions. Scanning of the cell area is performed for each color component.

Figure 24:
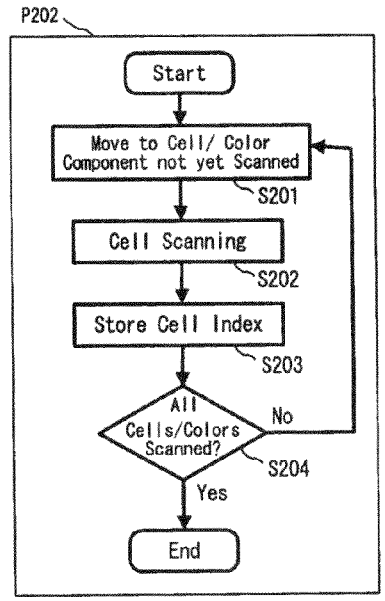
FIG. 24 is a flowchart showing a cell area scanning process according to the present invention.

FIG. 24 shows a series of processes relating to the cell area scanning step P202. As shown in FIG. 24, cell indexes of each color components are obtained from all data cells.

<Reference Data Obtaining/Verification Step P203>

In the reference data obtaining/verification step P203, reference information is obtained from a cell the display of which is fixed beforehand. The cell indexes obtained in the cell area scanning step P202 are used. The obtained reference information is verified to evaluate the adequacy of the envisaged two-dimensional code.

Obtaining of the reference information is performed by two separate steps of deciding the position (the cell area scanning step P202), and obtaining cell gradations from the position as reference information (reference data obtaining/verification step P203).

The cell area calculation step P201 according to this embodiment is performed in the below method.

In this embodiment, reference marks 030 and positioning marks 202 (FIG. 3) are used as cell indexes for obtaining reference information. The reference information of white Rw, cyan Rc, magenta Rm, yellow Ry, red Rr, green Rg and blue Rb are obtained from reference marks (030W, 030C, 030M, 030Y, 030R, 030G, 030B). The reference information of black Rk is obtained from the positioning marks (020).

The obtained reference information are composed of cell indexes of a plurality of color components. For example, CMY values are obtained as (Rxc, Rxm, Rxy) from a reference mark Rx of a color component. The obtained reference information is stored in a memory area of the server M01.

Figure 25:
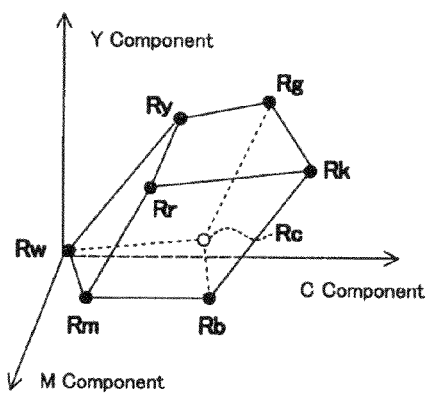
FIG. 25 is an illustration showing an example of plotting of reference information in a CMY color plane according to the present invention.

In FIG. 25, reference information (Rw, Rc, Rm, Ry, Rr, Rg, Rb, Rk) are plotted in a CMY color space having values of each CMY component as the axis. As shown in FIG. 25, the three-dimensional figure connecting each vertex of reference information that is affected at input or output is not a cube, but is distorted.

In this embodiment, verification of reference information is performed by evaluating whether gradations of the reference information (Rw, Rc, Rm, Ry, Rr, Rg, Rb, Rk) are appropriate for each color component of the image data. More specifically, color information of each reference cell are compared with the envisaged color information.

Chart 6 shows combinations of presence/absence of each color component. They are classified in a way that presence/absence of other color components are common.

CHART 6

| C Component | | M Component | | Y Component | |
|---|---|---|---|---|---|
| Absent | Present | Absent | Present | Absent | Present |
| Rw | Rc | Rw | Rm | Rw | Ry |
| Ry | Rg | Ry | Rr | Rm | Rr |
| Rm | Rb | Rc | Rb | Rc | Rg |
| Rr | Rk | Rg | Rk | Rb | Rk |

Chart 7 shows differences in gradations between reference information having the color component and reference information not having the color component for combinations of presence/absence of each color component shown in Chart 6. When the reference information is appropriate, each of the indexes (difference in gradation) shown in Chart 7 has a positive value.

CHART 7

| C Component | M Component | Y Component |
|---|---|---|
| $Rc_c - Rw_c$ | $Rm_m - Rw_m$ | $Ry_y - Rw_y$ |
| $Rg_c - Ry_c$ | $Rr_m - Ry_m$ | $Rr_y - Rm_y$ |
| $Rb_c - Rm_c$ | $Rb_m - Rc_m$ | $Rg_y - Rc_y$ |
| $Rk_c - Rr_c$ | $Rk_m - Rg_m$ | $Rk_y - Rb_y$ |

In this embodiment, when values of all of the indexes of Chart 7 are positive, it is considered "appropriate" as the envisaged two-dimensional code, and it is considered "inappropriate" when any of the values are negative. When the evaluation result is "inappropriate", it is considered a positioning error E2-1 (Chart 9).

Errors detected in the reference data obtaining/verification step P203 of the cell determination means 323 are output to a process control means 341.

<Cell Display Determination Step P204>

In the cell display determination step P204, each cell is determined to specify its display. The cell indexes obtained in the cell area scanning step P202 and the reference information obtained in the reference Data Obtaining/Verification Step P203 are used.

Determination of cell display is performed by two separate steps of deciding the position (the cell area scanning step P202), and obtaining cell gradations from the position to determine the cell display (cell display determination step P204).

The cell area calculation step P201 according to this embodiment is performed in the below method.

Determination of cells is performed by assigning the cell indexes in a determination formula (Formula 6) for each cell. The presence/absence of a mark is determined for each color component using this formula. More specifically, when $Jd \geq 0$ in Formula 6, it is considered that a mark of the color component exists. When $Jd<0$, it is considered that the mark does not exist.

$$Jd = x + b \cdot y + c \cdot z + d$$

$$b = [\Sigma x_i y_i \{(\Sigma z_i)^2 - 4\Sigma z_i^2\} + \Sigma x_i z_i \{\Sigma y_i z_i - \Sigma y_i \Sigma z_i\} + x_i \{\Sigma y_i \Sigma z_i^2 - \Sigma z_i \Sigma y_i z_i\}]/det$$

$$c = [\Sigma x_i y_i \{4\Sigma y_i z_i - \Sigma y_i \Sigma z_i\} + \Sigma x_i z_i \{(\Sigma y_i)^2 - 4\Sigma y_i^2\} + \Sigma x_i \{\Sigma z_i \Sigma y_i^2 - \Sigma y_i \Sigma y_i z_i\}]/det$$

$$d = [\Sigma x_i y_i \{\Sigma y_i \Sigma z_i^2 - \Sigma z_i \Sigma y_i z_i\} + \Sigma x_i z_i \{\Sigma z_i \Sigma y_i^2 - \Sigma y_i \Sigma y_i z_i\} + \Sigma x_i \{(\Sigma y_i z_i)^2 - \Sigma y_i^2 \Sigma z_i^2\}]/det$$

$$det = 4\Sigma y_i^2 \Sigma z_i^2 + 2\Sigma y_i \Sigma z_i \Sigma y_i z_i - (\Sigma y_i)^2 \Sigma z_i^2 - (\Sigma z_i)^2 \Sigma y_i^2 - 4(\Sigma y_i z_i)^2$$

[Formula 6]

Cell indexes of each color component (Jmc, Jmm, Jmy) are assigned to variables (x, y, z). At that time, value of the color component to be determined is assigned to variable x, and values of the other two color components are assigned to variables y and x. Chart 8 shows the relationships between variables (x, y, z) and corresponding color components for each target color component to be determined.

CHART 8

| Determination Target | (x, y, z) |
|---|---|
| C Component | (C Component, M Component, Y Component) |
| M Component | (M Component, Y Component, C Component) |
| Y Component | (Y Component, C Component, M Component) |

In Formula 6, b, c, d are calculated using reference information (Rw, Rc, Rm, Ry, Rr, Rg, Rb, Rk) for each target color component to be determined.

(xi, yi, zi) are calculated based on two reference information classified by the presence/absence of the target color component to be determined, using the combinations shown in FIG. 6. For $\Sigma$, the sum is calculated for all four combinations shown in FIG. 6.

Formula 7 is a formula used for calculation of (xi, yi, zi).

$$(x_i, y_i, z_i) = ([(1-P_4) \cdot x_{0i} + P_4 \cdot x_{1i}], [(1-P_4) \cdot y_{0i} + P_4 \cdot y_{1i}], [(1-P_4) \cdot z_{0i} + P_4 \cdot z_{1i}])$$

[Formula 7]

Reference information R1 having the target color component to be determined is assigned to (x1$i$, y1$i$, z1$i$), and reference information R0 that does not have the target color component to be determined is assigned to (x0$i$, y0$i$, z0$i$). It is to be noted that (x1$i$, y1$i$, z1$i$) and (x0$i$, y0$i$, z0$i$) are obtained using the relationships shown in Chart 8, similarly to variables (x, y, z).

P4 is a cell determination parameter, and is managed by a process control means 341.

Figure 26:
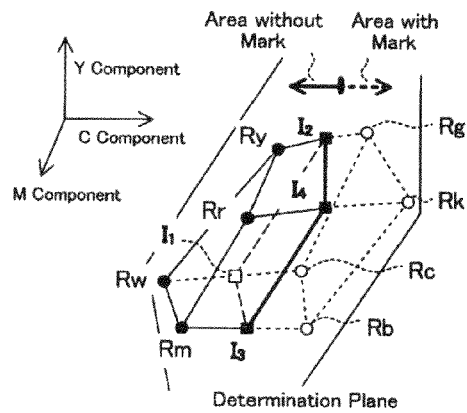
FIG. 26 is an illustration showing an example of a determination plane in a CMY color plane according to the present invention.

A determination formula, Formula 6 is described in further detail hereinafter. FIG. 26 shows an example of a relationship between a three-dimensional figure with reference information as vertexes (FIG. 25) and a determination plane (Jd=0) of Formula 6 on a CMY color plane. The determination plane in FIG. 26 is for determining the presence/absence of a C component mark. When the cell indexes are plotted on the positive side of the C component axis ($Jd \geq 0$), it is considered that a mark exists. When they are plotted on the negative side ($Jd<0$), it is considered that a mark does not exist.

The determination plane in FIG. 26 classifies reference information into two aggregates by the presence/absence of the color component to be determined according to the combinations shown in FIG. 8. This also signifies that the determination plane crosses with line segments connecting each of the four pairs of two points, (Rw, Rc), (Ry, Rg), (Rm, Rb), (Rr, Rk) where the combination of other color components are the same at (I1, I2, I3, I4).

The determination plane is not limited to a plane, as shown in FIG. 26. It may also be a quadric surface, for example. In that case, the determination formula is a quadratic expression.

Figure 27:
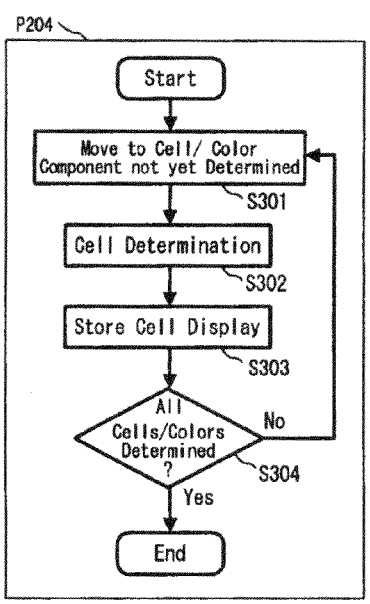
FIG. 27 is a flowchart showing a cell display determination process according to the present invention.

FIG. 27 shows a series of processes relating to the cell display determination step P204. As shown in FIG. 27, determination of cell display is performed for all data cells for each color component.

<Decoding Means>

Figure 28:
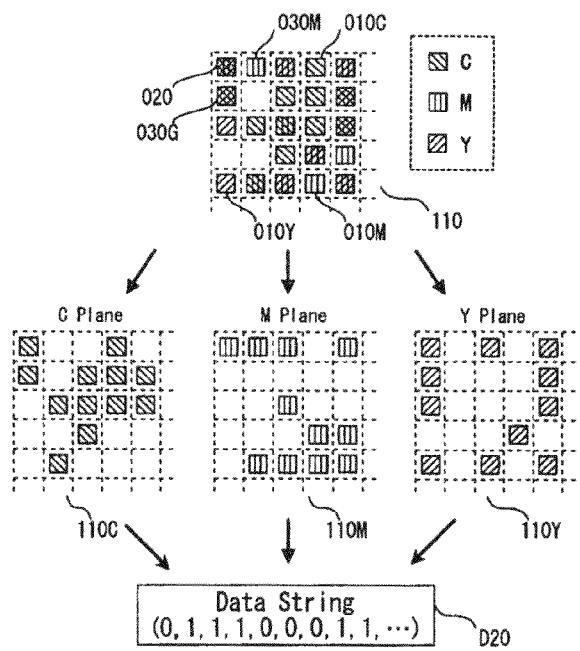
FIG. 28 is a conceptual diagram of a decoding mechanism of a bit string according to the present invention.

The decoding means 324 decodes the cell display specified by the cell determination means 323 into a bit string based on a predetermined rule. The decoding process into a bit string is realized by performing a reverse processing of that performed by the encoding means 222. FIG. 28 shows a conceptual diagram of the bit string decoding according to this embodiment.

In FIG. 28, "with mark" corresponds to "1" and "without mark" corresponds to "0" in the cell displays (110C, 110M, 110Y) specified for each color component. Code data D20 is obtained using the same allocation rules used by the encoding means 222 in a reverse process.

<Data Converting/Verification Means 325>

The data converting/verification means 325 retrieves a record number D00 in the database from the code data D20 obtained by the decoding means 324. The data converting/verification means 325 is realized by performing a reverse processing of that performed by the encoding means 222 (FIG. 9). It is to be noted, however, that the code data D20 may contain data error.

Data 03 is obtained by performing data separation (C20) and bit position decoding (C03) on code data 20, and may contain data error. Decoding processing of the error-correcting code (C02) is performed on data 03 to obtain data 02. Thus, error correcting is performed on the error in data 03. When the error cannot be corrected, error detection is performed. In that case, the error is detected as a data error. In this embodiment, this type of data error is considered a cell determination error E3-1 (Chart 9).

Decoding processing of encryption (C01) is performed on data 02 to obtain data 01. Data error of the obtained data 01 is verified using the redundancy bits added at the time of two-dimensional code publication. In this embodiment, verification is performed by checking whether the bit string recorded in the database 120 matches the upper 10 bits of the bit string D01. It is detected as a data error when the redundancy bits do not match.

The error detected by the data converting/verification means 325 is output to a process control means 341.

<Data Output Part>

The data output part 330 outputs the bit string obtained in the two-dimensional code deciphering part 320. In this embodiment, the record number D00 in the database 120 is output to a management program of the database 120. Furthermore, the output record number D00 is verified against the database 120, and an error is detected when there is a mismatch.

As shown in FIG. 14, the data output part 330 according to this embodiment is composed of a data output means 331. The data output means 331 is realized by executing a program which is prepared beforehand in the server M01. Deciphering of the two-dimensional code and management of the database by the data output means 331 may be processed by different computers. In that case, information is sent and received between the computers. Existing communication techniques are used for the communication.

The management program of the database 120 searches the database and extracts the record that matches the record number D00. Thus, the address described in the record is referred to in order to specify the stored content. Then, an action according to the action type (Chart 1) described in the record is performed, such as sending it to the two-dimensional code obtaining device M03.

means 341. The process control means 341 is realized by executing a program which is prepared beforehand in the server M01.

Errors according to this embodiment are detected in the two-dimensional code input means 311, the cell determination means 323, the data converting/verification means 325 and the data output means 331. Chart 9 shows the error type, the condition for determination of the error, the reason for error and the process to be performed in response to the error. The process control means 341 performs the process predetermined for each error type as shown in Chart 9.

CHART 9

| Detecting Means | Error Type | Determination Condition | Reason for Error | Process |
|---|---|---|---|---|
| Two-dimensional Code Input Means | E1-1 | "Sending Address" ⊆ "Inappropriate Address List" | Sent from Inappropriate Address | Output Error |
| | E1-2 | "Number of Access from Same Address" ≧ "5 Times within 10 Seconds" | Inappropriate Access Prevented | Output Error |
| Cell Determination Means | E2-1 | "Minimum Distance between Color Spaces within Reference Information" <0 | Positioning Error | Change Parameter ->Positioning Means (Repeat Process) Output Error |
| Data Converting/ Verification Means | E3-1 | Error Detected (BCH Code) | Cell Determination Error | Change Parameter ->Cell Determination Means (Repeat Process) Output Error |
| | E3-2 | "Redundancy Bit" ≠ "00 . . . 0" | Data Mismatch | Output Error |
| Data Output Means | E4-1 | "Database Decoding Status" = "0" | Data Mismatch | Output Error |

In action example 1 of "send to portable device" (A000 in Chart 1), the content is returned using an e-mail function. The content is received by the portable device which is the two-dimensional code obtaining device M03, and then used by a user by being displayed on a display, etc. The content may also be processed by the user or transferred to another device as general digital information.

When there is a mismatch in the record extracted by searching the database, it is detected as an error. In this embodiment, mismatches are managed for each record by creating a field within the database for recording the status of the two-dimensional code (1="can be decoded", 0="cannot be decoded") as shown in FIG. 2.

In the database according to this embodiment, the number of records of status="1" (can be decoded) out of the total number of records is limited. Therefore, the status of records with at least 10 bits or more is "0" (cannot be decoded). Thus, errors can be detected to ensure security of record management.

Errors detected in the data output means 331 are output to the process control means 341.

<Process Control Part>

A process control part 340 controls processing of the error detected in the decoding process. The process control part 340 attempts to avoid the error by changing the analyzing parameter and repeating the decoding process. If the error cannot be avoided, in other words when the deciphering process is repeated more than a predetermined number of times, the error is output to the two-dimensional code obtaining device M03 that sent the two-dimensional code.

As shown in FIG. 14, the process control part 340 according to this embodiment is composed of a process control The cell determination means 323 reads out abnormality from the reference cell and detects error in the specified cell position. The appropriate position may be specified by changing the parameter values. Furthermore, since errors are detected during the process, calculation burden caused by repeating the process is reduced.

Possibility of allowance for distortion in the image data is determined at the same time. This way, the rate of error included in the determined bit string may be reduced below a desired level, thus reducing the probability of missed error.

The data converting/verification means 325 detects error within the deciphered bit string. Thus, determination suited for the image may be performed by changing the parameter value. Furthermore, since errors are detected without accessing the database 120, calculation burden caused by repeating the process is reduced.

It is preferable to apply parameters in deciphering the two-dimensional codes, and select a favorable level for each parameter from a plurality of levels prepared beforehand. Selection of levels is preformed dynamically by referring to a table prepared beforehand, for example, in order to make an appropriate selection for each decoding process. For example, the image data is analyzed first in order to select the level suited for the image data based on the analysis result. When an error is detected, a different level may be selected to perform the deciphering process again.

The analyzing parameters in this embodiment are the positioning parameter and the cell determination parameter. A plurality of levels are prepared for each parameter (Chart 10).

CHART 10

| Parameter | | Level 1 | Level 2 | Level 3 | Level 4 |
|---|---|---|---|---|---|
| Positioning Parameter | $P_0$ | 0 | 90° | 180° | 270° |
| | $P_1$ | 0.5 | 1.0 | 2.0 | — |
| | $P_2$ | 0.4 | 0.8 | 1.2 | — |
| Cell Determination Parameter | $P_3$ | 0 | 0.5 | 1.0 | — |
| | $P_4$ | 0.25 | 0.5 | 0.75 | — |

When a positioning error E2-1 is detected as the error type, values of the positioning parameter is changed and the positioning process is repeated by the positioning means 322. In the positioning means 322, P1 of Formula 3 in the code area extraction step P101 and P2 of Formula 4 in the code area scanning step P103 are used as positioning parameters.

In order to verify the rotating angle of the two-dimensional code within the image data, a rotating angle P0 is used as the positioning parameter. More specifically, the image data is not rotated at level 1, rotated 90 degrees clockwise at level 2, rotated 180 degrees clockwise at level 3 and rotated 270 degrees clockwise at level 4, and reference information is evaluated in each case. When the positioning marks are arranged in a rotationally symmetrical manner as in this embodiment, the rotating angle of the two-dimensional code within the image data may be specified by arranging display of the reference cells so that they are not rotationally symmetrical and verifying the reference cells when decoding the two-dimensional code.

Figure 29:
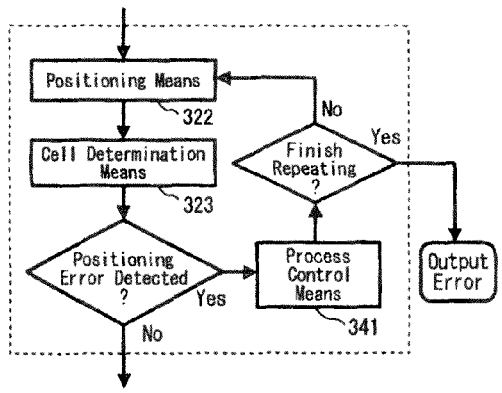
FIG. 29 is a flowchart showing a flow of processes when a positioning error is detected according to the present invention.

FIG. 29 is a flowchart showing a flow of processes when a positioning error E2-1 is detected by the cell determination means 323. Positioning is repeated until the positioning error E2-1 is not detected or until a predetermined flow is completed. When the positioning error E2-1 is not detected, the process moves on to the decoding means 324. When the flow is completed, the decoding process is stopped and the error is output.

Chart 11 shows a setting order of positioning parameters, P1 and P2. Repeating of levels 1 to 4 of the positioning parameter P0 are applied to each of the settings (repeating order 1 to 5) in Chart 11. In this embodiment, repeating of the positioning process is terminated when the series of setting (repeating order 1 to 5) shown in chart 11 is completed.

CHART 11

| Repeating Order | $P_1$ | $P_2$ |
|---|---|---|
| 1 | Level 2 | Level 2 |
| 2 | Level 1 | Level 2 |
| 3 | Level 3 | Level 2 |
| 4 | Level 2 | Level 1 |
| 5 | Level 2 | Level 3 |

When a cell determination error E3-1 is detected as the error type, the values of the cell determination parameter is changed and cell determination by the cell determination means 323 is repeated. In the cell determination means 323, P3 of Formula 5 in the cell area scanning step P202 and P4 of Formula 7 in the cell display determination step P204 are used as cell determination parameters.

Figure 30:
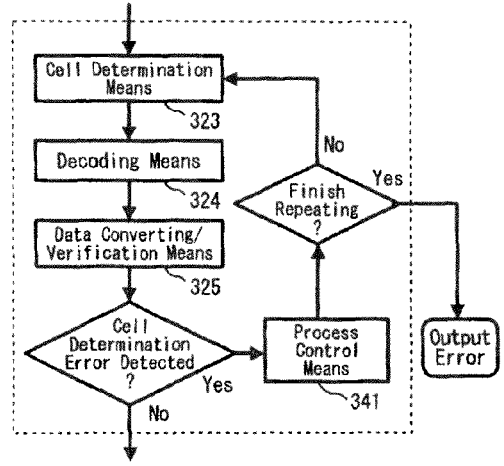
FIG. 30 is a flowchart showing a flow of processes when a cell determination error is detected according to the present invention.

FIG. 30 is a flowchart showing a flow of processes when a cell determination error E3-1 is detected by the data converting/verification means 325. Cell determination is repeated until the cell determination error E3-1 is not detected or until a predetermined flow is completed. When the cell determination error E3-1 is not detected, the process moves on to the data output means 331. When the flow is completed, the decoding process is stopped and the error is output.

Chart 12 shows a setting order of cell determination parameters, P3 and P4. In this embodiment, repeating of the cell determination process is terminated when the series of setting (repeating order 1 to 5) shown in chart 12 is completed.

CHART 12

| Repeating Order | $P_3$ | $P_4$ |
|---|---|---|
| 1 | Level 2 | Level 2 |
| 2 | Level 1 | Level 2 |
| 3 | Level 3 | Level 2 |
| 4 | Level 2 | Level 1 |
| 5 | Level 2 | Level 3 |

The process control means 341 outputs an error when error cannot be avoided. In such a case, the "error type" and/or the "reason for error" are sent to the two-dimensional code obtaining device M03. Furthermore, when the error type is E3-1 (cell determination error), the error is analyzed and the analysis result is sent to the two-dimensional code obtaining device M03.

In analyzing the cause of error, determination conditions shown in Chart 13 are used. When a determination condition is fulfilled, the "cause of error" and/or "image capturing advice" are obtained.

CHART 13

| Analysis Target | Determination Order | Condition | Cause of Error | Image Capturing Advice |
|---|---|---|---|---|
| Positioning Mark (Position) | 1 | "Area Ratio of Code Area within Image" ≦10% | Image Capturing Size if Too Small | Move Camera Closer Use Zoom Function |
| Positioning Mark (Position) | 2 | "Area Ratio of Code Area within Image" ≧80% | Image Capturing Size if Too Big | Move Camera Farther Away |
| Positioning Mark (Position) | 3 | "Minimum/Maximum Ratio of Distance between Marks" ≦50% | Code Shape is Distorted | Capture Image Straight from the Front |
| Reference Mark (Gradation) | 4 | "Gradation Difference between Mark/ Surrounding Blank Area (Average)" ≦0.2 | Image is not Focused | Move Camera Farther Away Use Macro Mode |

CHART 13-continued

| Analysis Target | Order | Determination Condition | Cause of Error | Image Capturing Advice |
|---|---|---|---|---|
| Blank Area (Gradation) | 5 | "Gradation of Blank Area (Average)" ≧0.5 | Image is Too Dark | Capture Image in Brighter Place Use Flash |
| Positioning Mark (Gradation) | 6 | "Gradation of Black Mark (Average)" ≦0.6 | Image is Too Light | Move Camera Farther Away Darken Code Display |
| Blank Area (Gradation) | 7 | "Minimum/Maximum Ratio of Gradation of Blank Area" ≦50% | Gradation Unevenness Exists in the Plane | Capture Image Straight from the Front Equalize Code Display |

In analyzing the cause of error (determination conditions shown in Chart 13), information such as the (four) positions of the positioning marks and the reference information are used. These values are obtained beforehand in the decoding process and stored in a memory area. However, in this embodiment, gradation of the black mark (reference information of black) is obtained from the positioning marks. Furthermore, gradation is obtained from the blank area surrounding the code area as the "gradation of the blank area".

Error determination as shown in Chart 13 is performed in the order of numbers shown in the "order" column. The error analysis process is terminated when the conditions match, and the cause of error is specified.

In this embodiment, error information (error type, reason for error, cause of error, image capturing advice) obtained by the process control means 341 are sent to a portable device which is the two-dimensional code obtaining device M03. The error information that are sent are displayed in text on a display attached to the portable device. This way, the user operating the portable device can refer to the error information and decide how to handle the error. In addition, the user may feel assured by understanding the cause of error, thus reducing dissatisfaction towards the system.

When the "cause of error" and/or "image capturing advice" are obtained by error analysis, the user recaptures the image of the two-dimensional code referring to the error information. The cause of error is corrected by the user, and a favorable two-dimensional code image can be obtained. Therefore, the error is avoided, thus allowing for successful decoding of the two-dimensional code.

The "image capturing advice" according to this embodiment describes such points as the distance between the two-dimensional code and the camera at the time of image capture (including zoom function), image capturing angle, brightness at the time of image capture (including flash and light emitting level of the display device), and focal point at the time of image capture (including macro mode).

<Two-Dimensional Code Decoding Flow>

Figure 31:
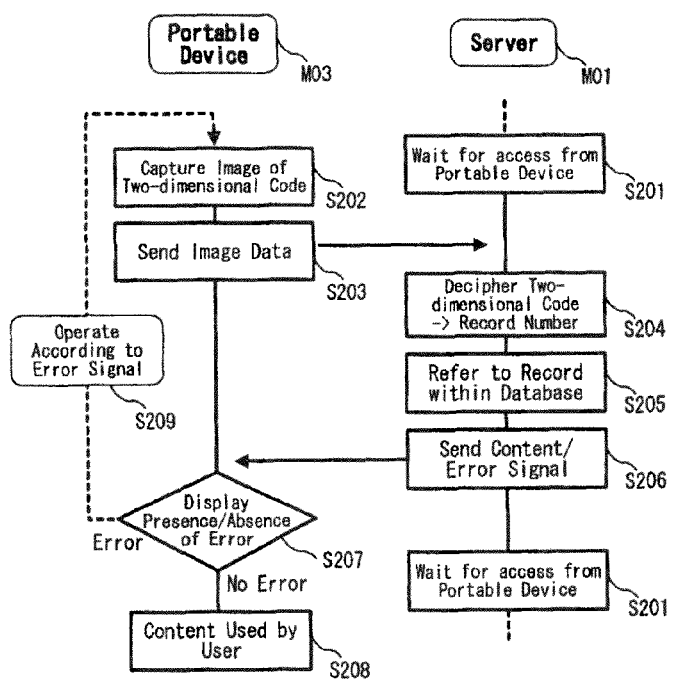
FIG. 31 shows an example of the communication procedures between devices in the two-dimensional code decoding process according to the present invention.

FIG. 31 shows an example of operations of the server M01 and the portable device which is the two-dimensional code obtaining device M03, and communication between the server M01 and the portable device in a two-dimensional code decoding flow according to this embodiment. In the example shown in FIG. 31, the action type is envisaged to be sending the content to the portable device M03.

S201: The server M01 waits for access from the portable device M03.

S202: User B captures the image of the two-dimensional code with the portable device M03 having an image-capturing function.

S203: The portable device M03 sends the image of the two-dimensional code to the server M01.

S204: The server M01 deciphers the two-dimensional code of the received image of and retrieves the record number from the database 120. When the two-dimensional code cannot be deciphered, error information is sent to the portable device M03 in step S206.

S205: The record of the retrieved record number is accessed to retrieve the action type and storage address of the content.

S206: The content stored in the storage address is sent to the portable device M03. When a deciphering error occurs, error information is sent instead of the content.

S207: The content of the error is displayed on the portable device M03 based on the error information. When the cause of the error is specified, the cause of error and/or image capturing advice in the decoding process are displayed.

S208: When the content is specified (no error occurred), the portable device M03 retrieves the content. User B uses the content according to his/her objectives.

S209: When the two-dimensional code cannot be deciphered (error occurred), user B checks the content of the error displayed on the portable device M03. When the cause of the error is specified, the image of the two-dimensional code is captured again referring to the cause of error and/or image capturing advice (S202), and the above flow is repeated.

In this embodiment, receiving and sending of data between the server M01 and the portable device M03 is performed via e-mail using an e-mailing function of the portable device M03.

The server M01 obtains the image of the two-dimensional code and the e-mail address of the portable device M03 by receiving an e-mail. For example, when outputting the content specified by deciphering the two-dimensional code to the portable device M03, an e-mail is set to the obtained e-mail address.

The e-mailing function of the portable device M03 is realized by an e-mail sending/receiving means generally equipped on the portable device M03. The e-mailing function can usually send the e-mail message body as well as file attachments. Here, image data of the two-dimensional code and electronic data content are sent and received. A list of the title, received date, etc. of the received e-mail is displayed using a mailer equipped to the portable device M03.

When the content is text data, the text data is inserted to the e-mail message body. For example, when sending a web address to user B, the web address is written in the e-mail message body. User B then accesses the web address from the portable device.

The server M01 according to this embodiment is equipped with a mail server function using SMTP (Simple Mail Transfer Protocol) and POP (Post Office Protocol).

The server M01 has a filtering function to delete inappropriate e-mail. E-mails sent from a sender other than mobile telecommunications companies may be deleted, for example.

Appropriateness of e-mails is determined by the e-mail address of the sender. E-mails from e-mail addresses in a list of inappropriate addresses may also be deleted. E-mails with an attached image file the format and/or size of which are inappropriate may also be deleted. Appropriate format and size may be JPEG and 10 kilobytes to 1 megabyte, respectively.

Numerous modifications and alternative embodiments of the invention will be apparent to those skilled in the art in view of the foregoing description. This description, accordingly, is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method of publishing a two-dimensional code on a computer, the two-dimensional code expressing a bit string on a plurality of cells arranged two-dimensionally by a combination of gradations of a plurality of color components that constitute a display of each of the plurality of cells, comprising the computer executing the following steps:
setting a gradation of a color component so that a contrast is created between a blank area and a display of a cell, when the display of the cell has a color with a low visibility against the blank area surrounding the two-dimensional code; and
setting a gradation of a color component so that a contrast is reduced between a blank area and a display of the cell, when the display of the cell has a color with a high visibility against the blank area surrounding the two-dimensional code.

2. The method according to claim 1, wherein:
the display of the each of the plurality of cells is expressed by a combination of presence/absence of a mark on the plurality of color components;
the display of the cell having a color with a low visibility against the blank area does not have a mark on any of the color components constituting the display; and
the display of the cell having a color with a high visibility against the blank area has a mark on every color component constituting the display.

3. The method according to claim 1, wherein:
the display of the each of the plurality of cells is expressed by a mark arranged on each cell surrounded by a blank area.

4. The method according to claim 1, further comprising the step of sending an image data including the two-dimensional code to a client terminal connected to a network.

5. A method of publishing a two-dimensional code executed on a computer, the two-dimensional code expressing a bit string on a plurality of cells arranged two-dimensionally by a combination of gradations of a plurality of color components that constitute a display of each of the plurality of cells, comprising the computer executing the following steps:
selecting a combination of the displays of the plurality of cells from a plurality of candidates allocated to the bit string, wherein
a display having a color with a low visibility against a blank area surrounding the two-dimensional code and a display having a color with a high visibility against the blank area surrounding the two-dimensional code is avoided when selecting the combination of the displays.

6. The method according to claim 5, wherein:
a consecutive arrangement of a display having a same color as an adjacent cell is avoided when selecting the combination of the displays.

7. The method according to claim 5, wherein:
the bit string expressed by the displays of the plurality of cells is associated to an electronic content using a database; and
the bit string is more redundant than a bit string needed for management of the content.

8. The method according to claim 5, further comprising the step of sending an image data including the two-dimensional code to a client terminal connected to a network.

9. A non-transitory computer readable medium, executable on a computer, for publishing a two-dimensional code, the two-dimensional code expressing a bit string on a plurality of cells arranged two-dimensionally by a combination of gradations of a plurality of color components that constitute a display of each of the plurality of cells, comprising the non-transitory computer readable medium causing the computer to execute the following steps:
setting a gradation of a color component so that a contrast is created between a blank area and a display of a cell, when the display of the cell has a color with a low visibility against the blank area surrounding the two-dimensional code; or
setting a gradation of a color component so that a contrast is reduced between a blank area and a display of the cell, when the display of the cell has a color with a high visibility against the blank area surrounding the two-dimensional code.

10. The non-transitory computer readable medium according to claim 9, wherein:
the display of the each of the plurality of cells is expressed by a combination of presence/absence of a mark on the plurality of color components;
the display of the cell having a color with a low visibility against the blank area does not have a mark on any of the color components constituting the display; and
the display of the cell having a color with a high visibility against the blank area has a mark on every color component constituting the display.

11. The non-transitory computer readable medium according to claim 9, wherein:
the display of the each of the plurality of cells is expressed by a mark arranged on each cell surrounded by a blank area.

12. The non-transitory computer readable medium according to claim 9, further comprising the step of sending an image data including the two-dimensional code to a client terminal connected to a network.

13. A non-transitory computer readable medium, executable on a computer, for publishing a two-dimensional code, the two-dimensional code expressing a bit string on a plurality of cells arranged two-dimensionally by a combination of gradations of a plurality of color components that constitute a display of each of the plurality of cells, comprising the non-transitory computer readable medium causing the computer to execute the following steps:
selecting a combination of the displays of the plurality of cells from a plurality of candidates allocated to the bit string, wherein
a display having a color with a low visibility against a blank area surrounding the two-dimensional code or a display having a color with a high visibility against the blank area surrounding the two-dimensional code is avoided when selecting the combination of the displays.

14. The non-transitory computer readable medium according to claim 13, wherein:
a consecutive arrangement of a display having a same color as an adjacent cell is avoided when selecting the combination of the displays.

15. The non-transitory computer readable medium according to claim 13, wherein:
the bit string expressed by the displays of the plurality of cells is associated to an electronic content using a database; and
the bit string is more redundant than a bit string needed for management of the content.

16. The non-transitory computer readable medium according to claim 13, further comprising the step of sending an image data including the two-dimensional code to a client terminal connected to a network.

* * * * *